(12) United States Patent
Takeuchi et al.

(10) Patent No.: US 12,474,780 B2
(45) Date of Patent: Nov. 18, 2025

(54) TACTILE PRESENTATION DEVICE

(71) Applicant: Shanghai Tianma Micro-Electronics Co., Ltd., Shanghai (CN)

(72) Inventors: Shin Takeuchi, Kanagawa (JP); Hiroshi Haga, Kanagawa (JP)

(73) Assignee: Shanghai Tianma Micro-Electronics Co., Ltd., Shanghai (CN)

( * ) Notice: Subject to any disclaimer, the term of this patent is extended or adjusted under 35 U.S.C. 154(b) by 0 days.

(21) Appl. No.: 18/675,570

(22) Filed: May 28, 2024

(65) Prior Publication Data
US 2024/0402811 A1    Dec. 5, 2024

(30) Foreign Application Priority Data

May 29, 2023    (JP) ................................ 2023-087777

(51) Int. Cl.
*G06F 3/01*    (2006.01)
*G06F 3/041*    (2006.01)

(52) U.S. Cl.
CPC .............. *G06F 3/016* (2013.01); *G06F 3/041* (2013.01)

(58) Field of Classification Search
CPC ....... G06F 3/016; G06F 3/041; G06F 3/04883
See application file for complete search history.

(56) References Cited

U.S. PATENT DOCUMENTS

| | | | |
|---|---|---|---|
| 8,766,953 B1* | 7/2014 | Cheatham, III | G06F 3/0436 310/317 |
| 2011/0115734 A1 | 5/2011 | Harashima et al. | |
| 2013/0229384 A1 | 9/2013 | Adachi et al. | |
| 2015/0253850 A1* | 9/2015 | Behles | G06F 3/0482 715/702 |
| 2020/0004340 A1* | 1/2020 | Harris | G06F 3/0436 |
| 2020/0133425 A1 | 4/2020 | Taninaka et al. | |
| 2020/0184785 A1* | 6/2020 | Khoshkava | G06F 1/1652 |
| 2022/0164043 A1* | 5/2022 | Casset | B06B 1/0629 |
| 2023/0230296 A1* | 7/2023 | Duffy | B43K 29/08 345/582 |
| 2024/0272718 A1* | 8/2024 | Chen | G06F 3/0446 |

* cited by examiner

*Primary Examiner* — Premal R Patel
(74) *Attorney, Agent, or Firm* — Sughrue Mion, PLLC

(57) ABSTRACT

A tactile presentation device includes a panel including a region touchable by a user, vibrators disposed outside the touchable region, and a driving controller to supply driving signals to the vibrators. At least a part of the entire outer end of the panel is an absorber end region. Each point closest to one of the vibrators on the entire outer end of the panel is included in the absorber end region. The driving controller supplies driving signals to the vibrators to generate a standing wave on the touchable region. Each of the driving signals is a synthetic wave of a carrier and a modulating wave at a frequency lower than a frequency of the carrier. The driving controller is configured to control location of a node of the standing wave in the touchable region with phase differences among carriers of the driving signals for the vibrators.

7 Claims, 15 Drawing Sheets

| ABSORPTANCE /FREQUENCY | 1760Hz | 615Hz |
|---|---|---|
| 100% | GOOD | GOOD |
| 70% | GOOD | GOOD |
| 60% | PASS | GOOD |
| 50% | PASS | GOOD |
| 40% | PASS | GOOD |
| 30% | FAIL | GOOD |
| 10% | FAIL | FAIL |

SIMULATION RESULT IN THE CASE OF FOUR VIBRATORS

*FIG. 17*

| ABSORPTANCE /FREQUENCY | 1760Hz | 1057Hz |
|---|---|---|
| 100% | GOOD | GOOD |
| 70% | GOOD | GOOD |
| 60% | GOOD | GOOD |
| 50% | GOOD | GOOD |
| 40% | GOOD | GOOD |
| 30% | GOOD | GOOD |
| 10% | FAIL | FAIL |

SIMULATION RESULT IN THE CASE OF THREE VIBRATORS

*FIG. 18*

TACTILE PRESENTATION DEVICE

CROSS-REFERENCE TO RELATED APPLICATIONS

This non-provisional application claims priority under 35 U.S.C. § 119 (a) on Patent Application No. 2023-087777 filed in Japan on May 29, 2023, the entire content of which is hereby incorporated by reference.

BACKGROUND

This disclosure relates to a tactile presentation device.

In recent years, electronic devices including a touch panel, such as smartphones and car navigation systems, have been prevailing. When a user operates an object such as an icon included in the displayed user interface through the touch panel, the electronic device activates the function associated with the object.

The surface of the touch panel is uniformly solid and therefore, the touch panel provides the same tactile sensation to the user's finger no matter which part of the touch panel is touched by the finger. For this reason, there is a known art to provide feedback that makes the user perceive the existence of an object or the acceptance of operation of an object together with activation of the function associated therewith. This art vibrates the surface of the touch panel to present tactile stimulus to the finger in contact with the touch panel.

SUMMARY

An aspect of this disclosure is a tactile presentation device including: a panel including a region touchable by a user; a plurality of vibrators disposed outside the touchable region on the panel; and a driving controller configured to supply driving signals to the plurality of vibrators, wherein at least a part of the entire outer end of the panel is an absorber end region, wherein each point closest to one of the plurality of vibrators on the entire outer end of the panel is included in the absorber end region, wherein the driving controller is configured to supply driving signals to the plurality of vibrators to generate a standing wave on the touchable region, wherein each of the driving signals is a synthetic wave of a carrier and a modulating wave at a frequency lower than a frequency of the carrier, and wherein the driving controller is configured to control location of a node of the standing wave in the touchable region with phase differences among carriers of the driving signals for the plurality of vibrators.

It is to be understood that both the foregoing general description and the following detailed description are exemplary and explanatory and are not restrictive of this disclosure.

BRIEF DESCRIPTION OF THE DRAWINGS

FIG. 17 provides a simulation result obtained from a configuration example where four vibrators are provided and the entire outer end is an absorber end region.

FIG. 18 provides a simulation result obtained from a configuration example where three vibrators are provided and the entire outer end is an absorber end region.

EMBODIMENTS

Figure 1A:
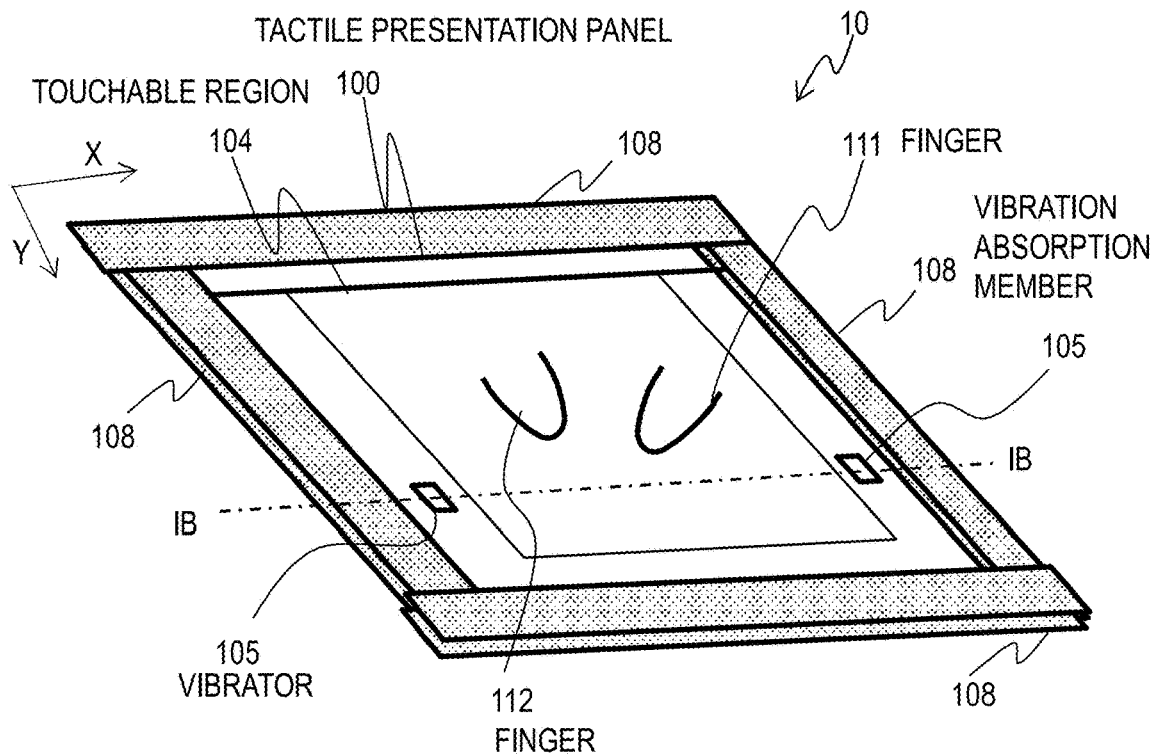
FIG. 1A is a perspective diagram of a tactile presentation device.

Hereinafter, embodiments are specifically described with reference to the drawings. Elements common to the drawings are denoted by the same reference signs. For clear understanding of the description, some elements in the drawings may be exaggerated in size or shape.

The described in the following is a tactile presentation device that presents tactile stimulus to a pointer (e.g., a finger) touching a panel. The tactile presentation device may be demanded to present tactile stimulus in a specific region of the panel when the region is touched and not to present tactile stimulus in the other region. For example, a display device with a touch panel may display choice regions for providing choices to the user and the other background region.

When one of the choice regions is touched by the user, the system performs processing associated with the touched choice. In such a configuration, the system presents tactile stimulus in the choice region and does not present tactile stimulus in the background region. In the foregoing example, a region providing a choice and the other region can be simultaneously touched by different fingers. In such a situation, the system is demanded to provide tactile stimulus to the finger touching the choice region and not to provide tactile stimulus to the finger touching the background region.

The displayed image is not always the same. When the displayed image is changed, the choice regions to present tactile stimulus and the background region not to present tactile stimulus can also be changed. Regarding the fingers that simultaneously touch the touch surface, the locations of the finger to be provided with tactile stimulus and the finger not to be provided with tactile stimulus are not always fixed. The system can be demanded to control the location to present tactile stimulus and the location not to present tactile stimulus depending on the locations of the fingers in contact with the touch panel.

The tactile presentation device in an embodiment of this specification presents tactile stimulus in a region selected from the touchable region of the panel where a touch of the user is effective. At least a part of the entire outer end of the panel is an absorber end region. The absorber end region absorbs a part or all of the vibration of the panel. The absorptance of the absorber end region is not less than 40%, for example.

A plurality of vibrators are disposed on the panel. The tactile presentation device controls the phase differences among the plurality of vibrators to control the location to present tactile stimulus and the location not to present tactile stimulus. The tactile presentation device may also control the vibration frequencies of the plurality of vibrators in addition to their phase differences. As a result, the location to present tactile stimulus and the location not to present tactile stimulus can be controlled more precisely. The tactile presentation device can present tactile stimulus at only a touch point selected from a plurality of touch points on the panel by controlling the locations of a node (and an antinode) of the standing wave.

Device Configuration

Figure 1B:
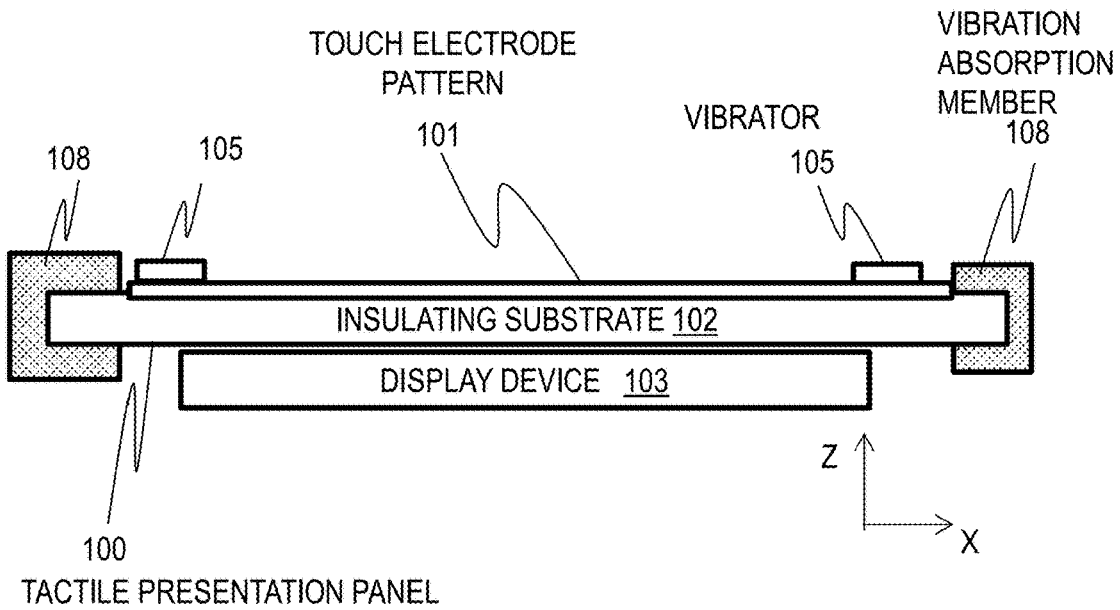
FIG. 1B is a cross-sectional diagram of the tactile presentation device along the section line IB-IB in FIG. 1A.

FIGS. 1A and 1B schematically illustrate a configuration example of a tactile presentation device in an embodiment of this specification. FIG. 1A is a perspective diagram of a tactile presentation device 10 and FIG. 1B is a cross-sectional diagram of the tactile presentation device 10 along the section line IB-IB in FIG. 1A. FIGS. 1A and 1B omit a driving controller for controlling the driving of the tactile presentation device 10.

The tactile presentation device 10 presents a user interface (UI) including at least one object (image) to the user and accepts the user's operation through the UI. The tactile presentation device 10 also provides tactile stimulus to the user to make the user perceive that an object included in the UI is operated. The components of the tactile presentation device 10 included in FIGS. 1A and 1B can be stored in a given housing.

The tactile presentation device 10 includes a tactile presentation panel 100 and a display device 103. As illustrated in FIG. 1A, the tactile presentation panel 100 has a touchable region 104 on the surface. The touchable region 104 is an effective region for a touch of the user. The tactile presentation device 10 actually presents tactile stimulus in a part of the touchable region 104. Within the touchable region 104, the location (tactile presentation partial region) where the tactile stimulus is actually presented and the location (tactile non-presentation partial region) where the tactile stimulus is not presented can change dynamically or can be fixed as specified by the user in the initial setting.

For convenience of description, the following description is provided assuming that the pointer to touch the tactile presentation panel 100 be a finger. FIG. 1A depicts that two fingers 111 and 112 are simultaneously touching different locations of the touchable region 104.

As illustrated in FIG. 1B, the tactile presentation panel 100 includes an insulating substrate 102 made of glass or resin and a touch electrode pattern 101 fabricated on the insulating substrate 102. The tactile presentation panel 100 is not only a tactile presentation panel but also a touch panel. The touch electrode pattern 101 enables detecting and locating user's fingers touching its front face of a touch surface. A part or the entirety of the touch electrode pattern 101 is included within the touchable region 104.

The touch electrode pattern 101 enables locating touch points of pointers on the tactile presentation panel 100. The touch detection with the touch electrode pattern 101 can be achieved by any method selected from resistive method, surface capacitive method, and projected capacitive method, for example.

As illustrated in FIG. 1B, the display device 103 is disposed under (behind) the tactile presentation panel 100. In this specification, the side where the user of the tactile presentation panel 100 is located is defined as front and the opposite side as back.

The display device 103 displays a UI image including objects in the touchable region 104. The display device 103 can be of any type; for example, it can be an organic light-emitting diode (OLED) display device, a liquid crystal display device, or a micro-LED display device.

The tactile presentation device 10 includes a vibration absorption member 108 attached on the outer end of the tactile presentation panel 100. In the example in FIG. 1A, the entire outer end of the tactile presentation panel 100 is held by vibration absorption members 108. In other words, the entire outer end of the tactile presentation panel 100 is an absorber end region. In the example in FIG. 1A, the tactile presentation panel 100 has a rectangular shape and the vibration absorption members 108 are attached on the four sides of the tactile presentation panel 100.

The vibration absorption members 108 are in contact with the ends of the tactile presentation panel 100 to absorb a part or all of the propagating wave on the surface of the tactile presentation panel 100. The vibration absorption members 108 have viscoelasticity so as to attenuate the reflected wave more. The ends of the tactile presentation panel 100 can be supported by not-shown support members with the vibration absorption members 108 interposed therebetween.

The vibration absorption members 108 can be made of rubber, elastomer, or resin, but not to limited to these. The vibration absorption members 108 can be made of a material having viscoelasticity or can have a viscoelastic characteristic attained by their structure. The vibration absorptance of the vibration absorption members 108 can be 30% or more, and moreover, 60% or more.

In the example illustrated in FIGS. 1A and 1B, two vibrators 105 are disposed on the tactile presentation panel 100. Each point closest to one of the two vibrators 105 on the outer end of the tactile presentation panel 100 is included in the absorber end region. As illustrated in FIG. 1A, two vibrators 105 are disposed outside the touchable region 104 and they are opposed to each other across the touchable region 104. Each vibrator 105 is disposed between a vibration absorption member 108 and the touchable region 104.

Each vibrator 105 of a vibration generator vibrates by itself to vibrate the surface of the touchable region 104, enabling tactile presentation to the pointer in contact with the touchable region 104. In the configuration example illustrated in FIGS. 1A and 1B, only the two vibrators 105 are the vibration generators to vibrate the tactile presentation panel 100 for tactile presentation.

The vibrators 105 can be piezoelectric elements and vibrate in the direction perpendicular to the main face of the tactile presentation panel 100. The direction of vibration of the vibrators 105 is not limited as far as the vibration of the vibrators 105 generates an intended standing wave on the tactile presentation panel 100. The vibrators 105 can be provided by disposing made-up elements on the insulating substrate 102 or by fabricating the elements directly on the insulating substrate 102 through a thin-film deposition process.

As will be described later, a two-dimensional standing wave can be generated by vibration of the two vibrators 105. The amplitude of the standing wave is in the direction perpendicular to the main face of the tactile presentation panel (the Z-axis direction in FIG. 1B). Nodes and antinodes appear alternately between the two vibrators 105 (in the X-axis direction in FIG. 1B).

The outer end of the tactile presentation panel 100 including an absorber end region enables the locations of the nodes of the standing wave to change largely by changing the phase difference between the vibration of the two vibrators 105. In addition, the locations of the nodes can be changed more variously by changing the vibration frequencies of the vibrators 105. That is to say, the location (region) to present tactile stimulus and the location (region) not to present tactile stimulus can be controlled desirably within the touchable region 104 by controlling the phase difference or the phase difference and the frequencies of the vibrators 105.

In the example illustrated in FIGS. 1A and 1B, the number of vibrators for generating standing wave is two and the entire outer end of the tactile presentation panel 100 is an absorber end region. In another configuration example, three or more vibrators can be disposed to be distant from one another. As will be described later, the locations of nodes can be controlled more minutely by increasing the number of vibrators. One or more parts of the outer end of the tactile presentation panel 100 can be fixed-end or free-end regions.

Figure 2A:
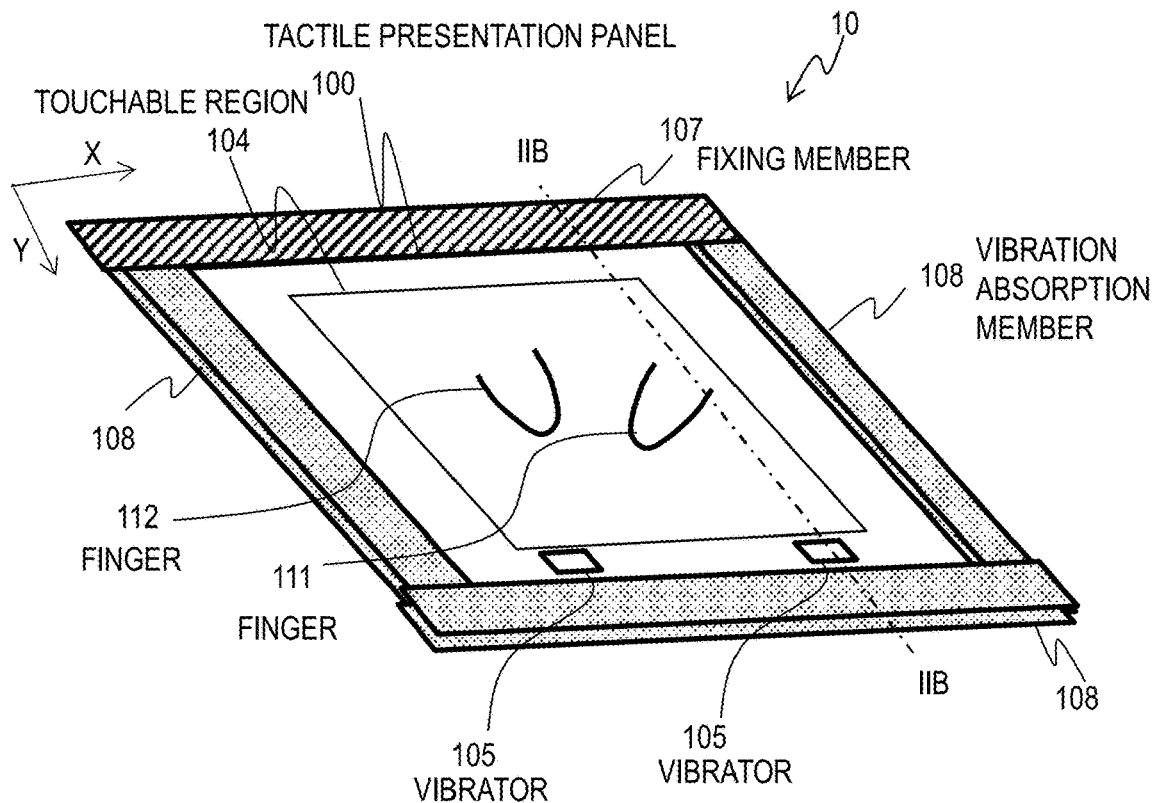
FIG. 2A is a perspective diagram of another tactile presentation device.
Figure 2B:
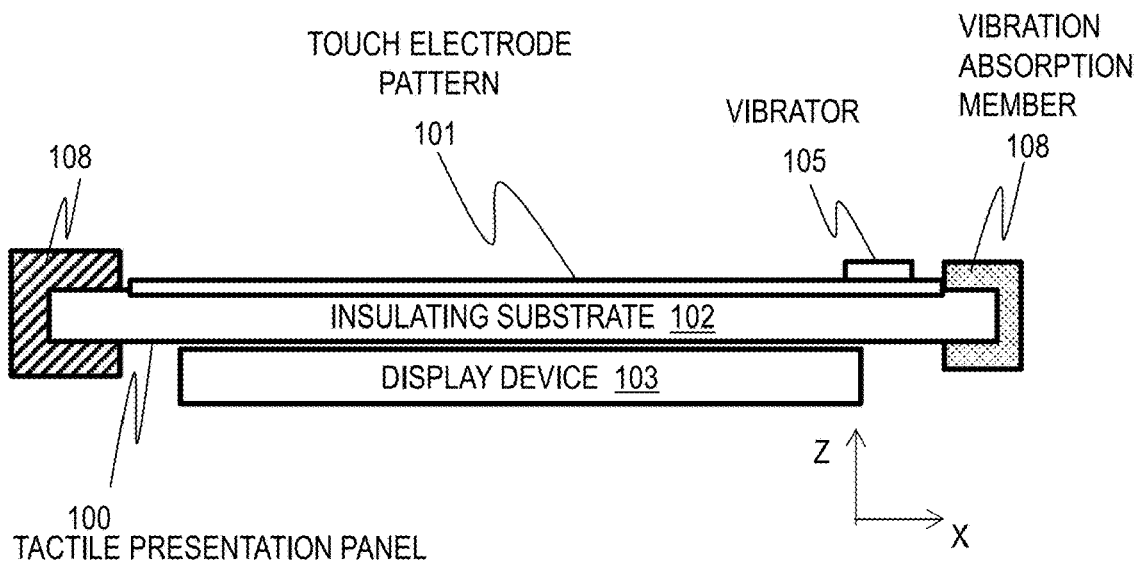
FIG. 2B is a cross-sectional diagram of the tactile presentation device along the section line IIB-IIB in FIG. 2A.

FIGS. 2A and 2B schematically illustrate a configuration example of a tactile presentation device 10 in another embodiment of this specification. FIG. 2A is a perspective diagram of the tactile presentation device 10 and FIG. 2B is a cross-sectional diagram of the tactile presentation device 10 along the section line IIB-IIB in FIG. 2A. FIGS. 2A and 2B omit a driving controller for controlling the driving of the tactile presentation device 10. The following mainly describes differences from the configuration example illustrated in FIGS. 1A and 1B.

In this configuration example, a part of the outer end of the tactile presentation panel 100 is a fixed-end region and the other part is an absorber end region. The fixed-end region is smaller in vibration absorptance and larger in absolute value of the vibration reflectance than the absorber end region. The fixed-end region enables various or minute control of node locations with fewer vibrators.

With reference to FIGS. 2A and 2B, the tactile presentation device 10 includes a fixing member 107 for fixing a part of the outer end of the tactile presentation panel 100 and vibration absorption members 108 attached on the other region. The fixing member 107 is in direct contact with the outer end of the tactile presentation panel 100 and fixes and supports the end region so that the propagating wave (propagating vibration) on the surface of the tactile presentation panel 100 reflects off the fixed end. The fixing member 107 can be made of resin or metal but the material is not limited to these. In the configuration example in FIG. 2A, one side of the rectangular tactile presentation panel 100 is fixed and supported by the fixing member 107 to form a fixed-end region. The other three sides are an absorber end region.

Two vibrators 105 are disposed on the opposite side of the fixing member 107 (fixed-end region) across the touchable region 104. In the example of FIG. 2A, the two vibrators 105 are disposed distant from each other along a side of the tactile presentation panel 100. The two vibrators 105 are disposed between the vibration absorption member 108 opposed to the fixing member 107 and the touchable region 104.

Each vibrator 105 vibrates by itself to vibrate the surface of the touchable region 104, enabling tactile presentation to the pointer in contact with the touchable region 104. In the configuration example illustrated in FIGS. 2A and 2B, only the two vibrators 105 are the vibration generators to vibrate the tactile presentation panel 100 for tactile presentation.

As will be described later, a two-dimensional standing wave can be generated by vibration of the two vibrators 105. The region fixed by the fixing member 107 is a fixed-end region and becomes a node of the standing wave. The fixed-end region is also a reflective end region that reflects the propagating wave. When the wave is reflected there, its phase is shifted. The reflectance of the fixed-end region is negative. The reflectance of a free-end region is positive. The reflectance of the most effective fixed end is −1 and the reflectance of the most effective free end is 1.

The outer end of the tactile presentation panel 100 including a fixed-end region or a free-end region enables generation of mesh-like nodes in the standing wave with two vibrators 105. The locations of the nodes of the standing wave can be changed by changing the phase difference of the vibration of the two vibrators 105. In addition, the locations of the nodes can be changed more variously by changing the vibration frequencies of the vibrators 105. That is to say, the location (region) to present tactile stimulus and the location (region) not to present tactile stimulus can be controlled desirably within the touchable region 104 by controlling the phase difference or the phase difference and the frequencies of the vibrators 105.

In the example illustrated in FIGS. 2A and 2B, the number of vibrators for generating a standing wave is two and a part of the outer end of the tactile presentation panel 100 is a fixed-end region. In another configuration example, three or more vibrators can be disposed to be distant from one another. At least a part of the fixed-end region can be a free-end region and a part of the absorber end region can be a fixed-end region or a free-end region.

Figure 3:
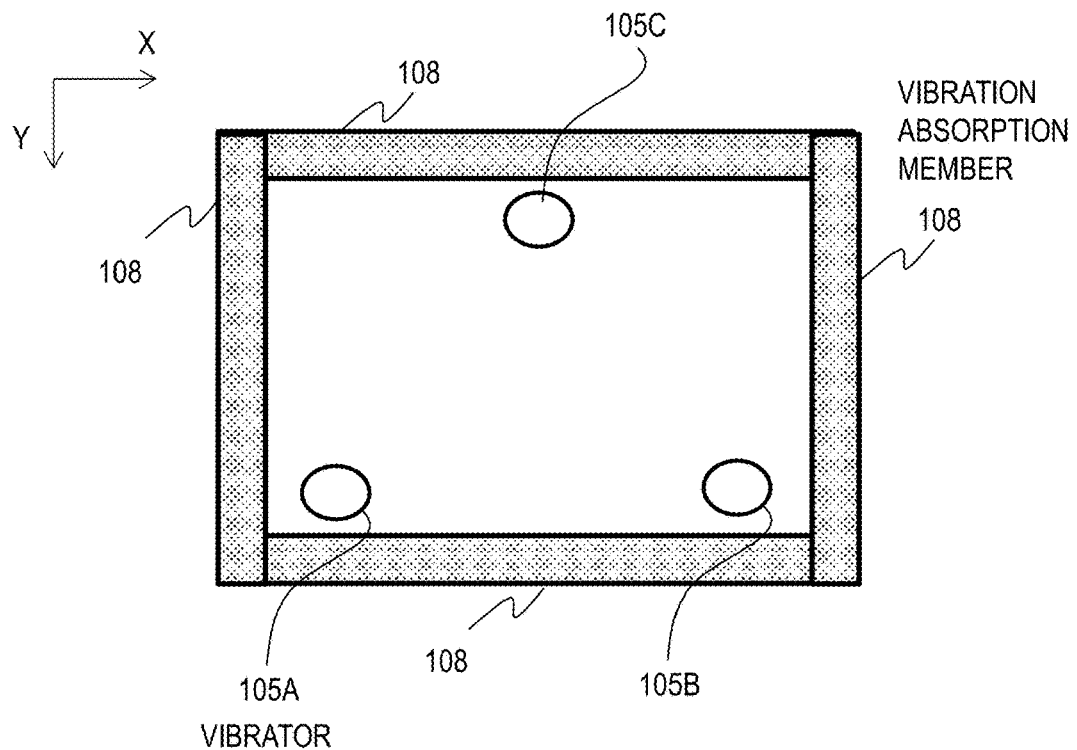
FIG. 3 illustrates a configuration example where three vibrators are disposed on a tactile presentation panel and the entire outer end of the tactile presentation panel is an absorber end region.
Figure 4:
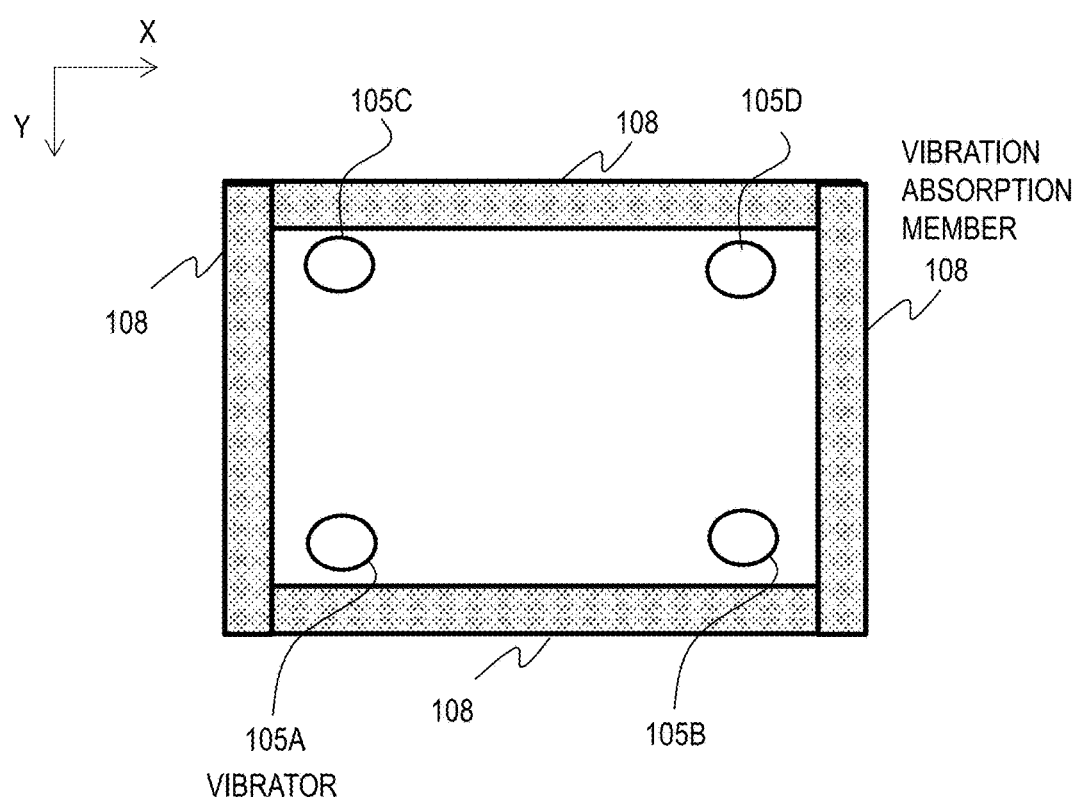
FIG. 4 illustrates a configuration example where four vibrators are disposed on a tactile presentation panel and the entire outer end of the tactile presentation panel is an absorber end region.

FIGS. 3 and 4 illustrate configuration examples of a tactile presentation panel and vibration absorption members. FIG. 3 illustrates a configuration example where three vibrators are disposed on a tactile presentation panel 100 and the entire outer end of the tactile presentation panel 100 is an absorber end region.

The tactile presentation panel 100 has a rectangular shape and its four sides are provided with vibration absorption members 108. The vibrators 105A, 105B, and 105C are disposed at the apexes of a virtual triangle. In the example of FIG. 3, the vibrators 105A, 105B and 105C are located at the apexes of an isosceles triangle. The vibrators 105A and 105B are located near corners of the tactile presentation panel 100 and the vibrator 105C is located near the midpoint of one side of the tactile presentation panel 100.

The vibrators 105A and 105B are located at the same position and the vibrator 105C is located at a different position with respect to the Y-axis (the vertical axis). The vibrator 105C is located at the center between the vibrators 105A and 105B with respect to the X-axis (the horizontal axis). The three vibrators are to be disposed at the apexes of a triangle but their locations are not limited to the example in FIG. 3.

FIG. 4 illustrates a configuration example where four vibrators are disposed on a tactile presentation panel 100 and the entire outer end of the tactile presentation panel 100 is an absorber end region. The tactile presentation panel 100 has a rectangular shape and its four sides are provided with vibration absorption members 108. The vibrators 105A to 105D are disposed at the apexes of a virtual quadrangle. In the example of FIG. 4, the vibrators 105A to 105D are located at the apexes of a rectangle. The vibrators 105A to 105D are located near the corners of the tactile presentation panel 100. The four vibrators are to be disposed at the apexes of a quadrangle but their locations are not limited to the example in FIG. 4. Three, four, five or more vibrators can be disposed differently from the examples in FIGS. 3 and 4.

Figure 5:
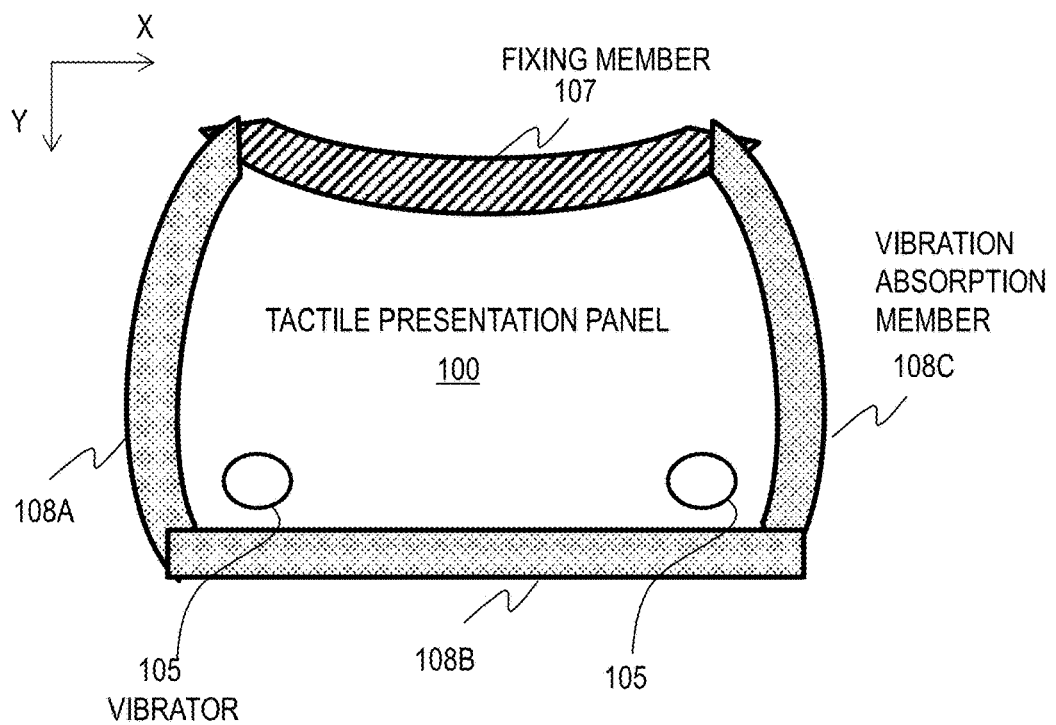
FIG. 5 illustrates a configuration example of a tactile presentation panel, a fixing member, and a vibration absorption member.
Figure 6:
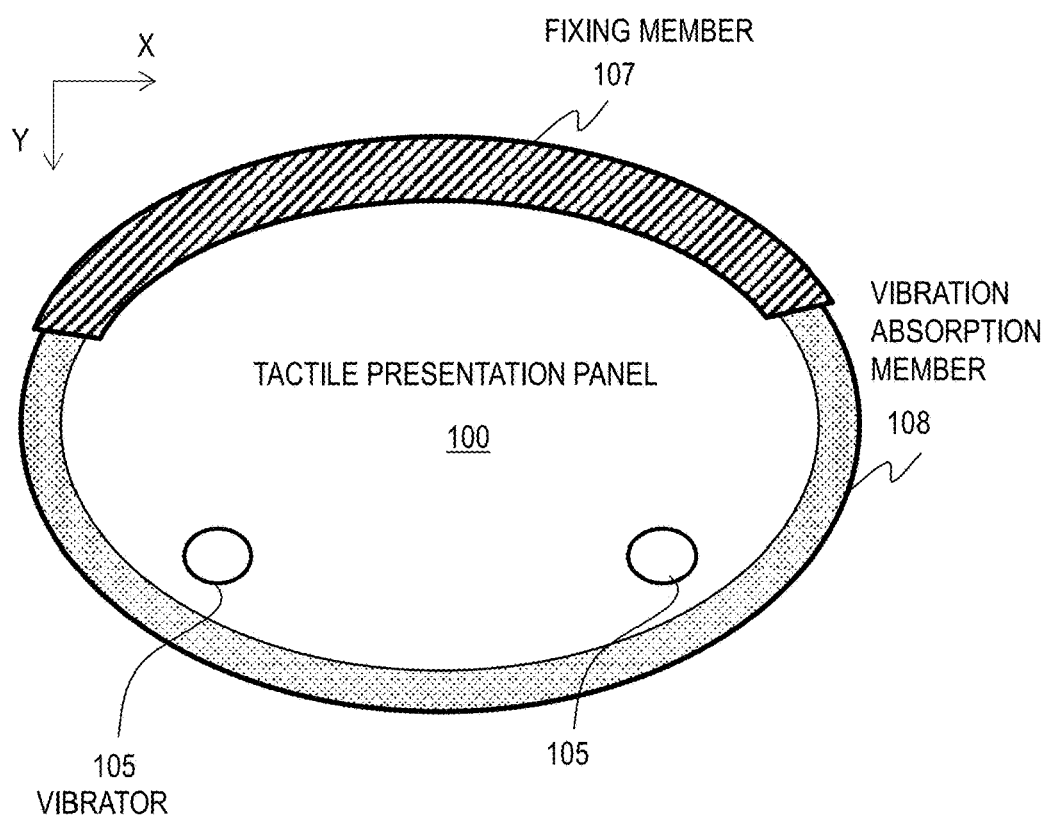
FIG. 6 illustrates another configuration example of a tactile presentation panel, a fixing member, and a vibration absorption member.
Figure 7:
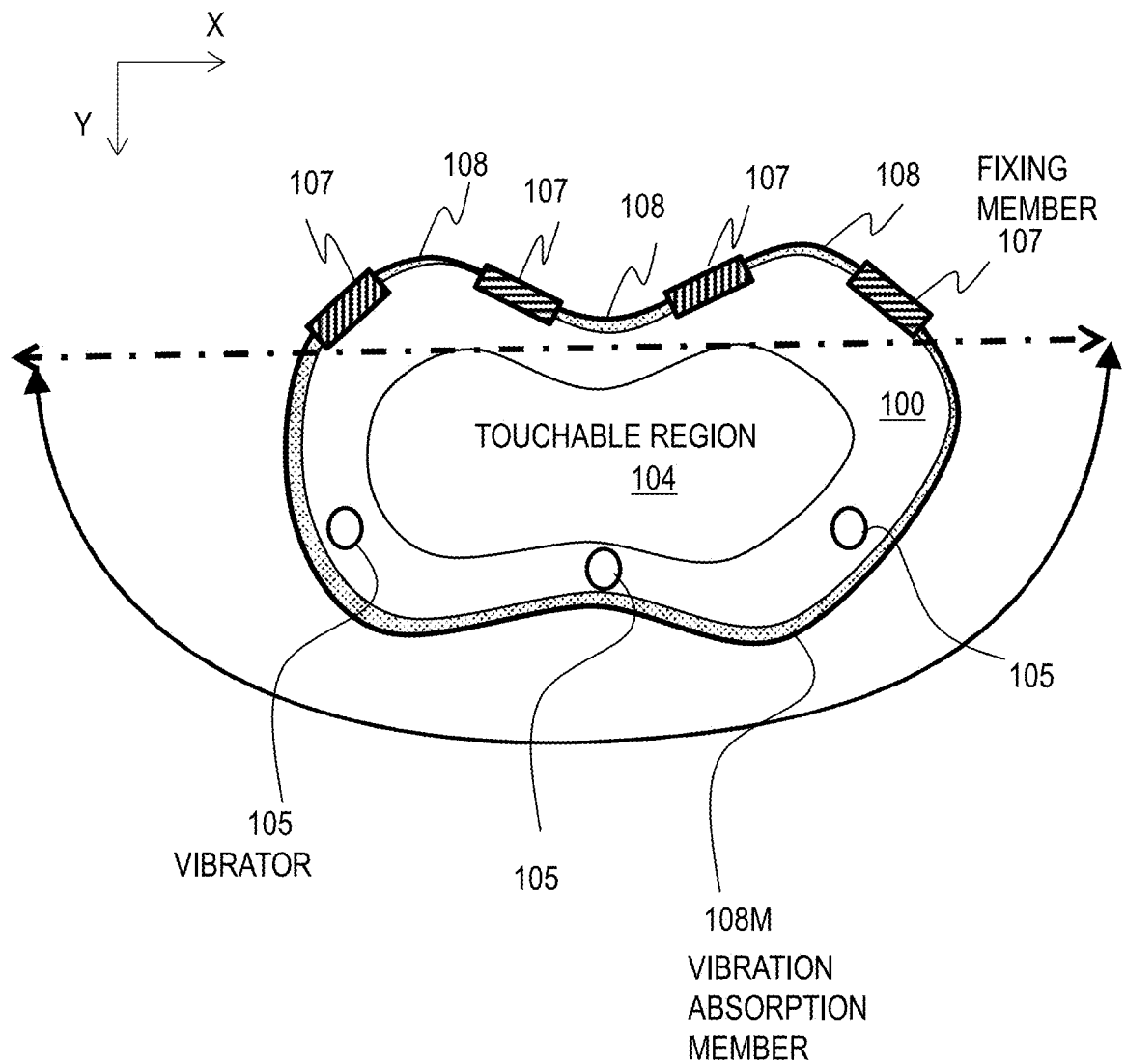
FIG. 7 illustrates still another configuration example of a tactile presentation panel, a fixing member, and a vibration absorption member

FIGS. 5, 6, and 7 illustrate configuration examples of a tactile presentation panel, a fixing member, and a vibration absorption member. As illustrated in FIGS. 5, 6, and 7, the tactile presentation panel 100 can have a shape different from a rectangle. In the configuration example of FIG. 5, one side of the tactile presentation panel 100 is linear and the other three sides are curved. The one linear side is provided with a vibration absorption member 108B and the opposite side is fixed by a fixing member 107. The other two sides are provided with vibration absorption members 108A and 108C.

Each point closest to one of two vibrators 105 on the outer end of the tactile presentation panel 100 is included in the absorber end region. The side of the tactile presentation panel 100 farthest from the two vibrators 105 is fixed by the fixing member 107. The touchable region (not shown) can be located inner than the two vibrators 105 and the fixing member 107.

In the configuration example of FIG. 6, the outer end of the tactile presentation panel 100 is oval. A part of the outer end is fixed by a fixing member 107. The other part is provided with a vibration absorption member 108. Each point closest to one of two vibrators 105 on the outer end of the tactile presentation panel 100 is included in the absorber end region. The touchable region (not shown) can be located inner than the two vibrators 105 and the fixing member 107.

In the configuration example of FIG. 7, the outer end of the tactile presentation panel 100 is curved more intricately. Three vibrators 105 are disposed to be distant from one another on the tactile presentation panel 100. Each point closest to one of the three vibrators 105 on the outer end of the tactile presentation panel 100 is included in an absorber end region. The three vibrators 105 are disposed between the touchable region 104 and one vibration absorption member 108M (absorber end region). The region on the opposite side of the three vibrators 105 is composed of absorber end regions and fixed-end regions disposed alternately.

In the configuration example of FIG. 7, the angle of view when viewing the absorber end region closest to the three vibrators 105 from any point in the touchable region 104 is not less than 180°. In other words, the continuous region in an angle of view of not less than 180° when viewed from any point of the touchable region 104 is an absorber end region and the all range viewed within 180° from any point of the touchable region 104 is an absorber end region. The same applies to all configuration examples illustrated in FIGS. 1 to 4. This configuration enables controlling the locations of the nodes of the standing wave more appropriately. In the configuration examples described with reference to FIGS. 3 to 5, the fixed-end region implemented by a fixing member 107 can be a free-end region.

Configuration of Driving Control

Figure 8:
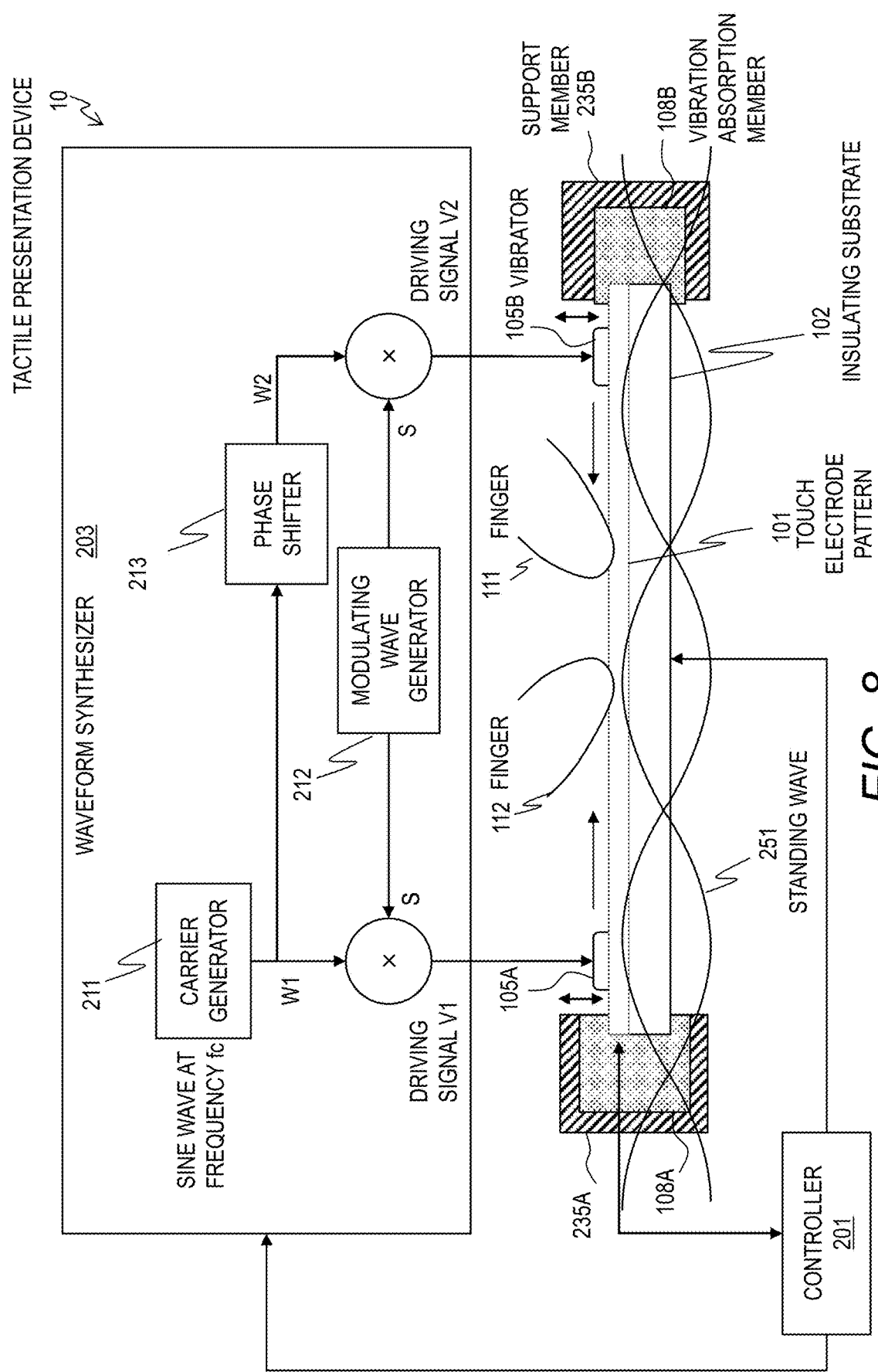
FIG. 8 is a schematic diagram for illustrating driving control of a tactile presentation device.

FIG. 8 is a schematic diagram for illustrating driving control of a tactile presentation device 10. The driving control device of the tactile presentation device 10 includes a controller 201 and a waveform synthesizer 203 of a driver. The controller 201 controls the display device 103 to present a specified image to the user through the transparent insulating substrate 102 of the tactile presentation panel.

The controller 201 can include one or more computing units for executing a program and one or more storage devices. Examples of the computing unit can include a processor, a graphics processing unit (GPU), and field programmable gate array (FPGA). The storage device stores programs and data to be used by the controller 201 and can include a volatile or non-volatile memory. The storage device includes a work area to be used by the programs.

The controller 201 works as function units (modules) for controlling the display device 103 and the tactile presentation panel 100. Specifically, the controller 201 performs touch detection, display control, and tactile control. The display control controls display of UI with the display device 103. Specifically, the display control acquires configuration information on the UI from the storage device and controls the display device 103 based on the information to display UI including at least one object.

The controller 201 drives the touch electrode pattern 101 to detect and locate one or more fingers touching the insulating substrate 102 (tactile presentation panel 100) based on the signals received from the touch electrode pattern 101. The controller 201 controls the image to be displayed by the display device 103 and also the vibrators 105A and 105B based on the determined touch points of the fingers. FIG. 8 includes two vibrators 105A and 105B by way of example.

Assuming that a finger 112 is touching a region corresponding to a specific object image and a finger 111 is touching the background region, the controller 201 controls the vibrators 105A and 105B to generate a standing wave such that the amplitude at the finger 112 is large and the amplitude at the finger 111 is small.

The controller 201 controls the waveform synthesizer 203 to generate driving signals V1 and V2 so as to vibrate the vibrators 105A and 105B at intended frequencies with an intended phase difference. The waveform synthesizer 203 includes a carrier generator 211, a modulating wave generator 212, and a phase shifter 213.

The carrier generator 211 outputs a sine wave at a frequency fc specified by the controller 201 as a carrier W1. The frequency fc is one of the parameters for changing the form of the standing wave. The phase shifter 213 shifts the phase of the carrier W1 to output a carrier W2 having a specific phase difference ϕ with respect to the carrier W1. The phase difference ϕ is one of the parameters for changing the form of the standing wave. The phase difference is specified by the controller 201.

The modulating wave generator 212 outputs a modulating wave S for modulating the carriers W1 and W2. The modulating wave has a predetermined window function. The synthetic wave of the carrier W1 and the modulating wave S is the driving signal V1 for driving the vibrator 105A. The synthetic wave of the carrier W2 and the modulating wave S is the driving signal V2 for driving the vibrator 105B.

The tactile presentation panel 100 (insulating substrate 102) is supported by support units at its opposite ends. One of the support units consists of a vibration absorption member 108A and a support member 235A and the other support unit consists of a vibration absorption member 108B and a support member 235B. The support members 235A and 235B can be made of the same material as the fixing member 107. One of the support units supports an end of the insulating substrate 102 with the support member 235A with the vibration absorption member 108A interposed therebetween. The other support unit supports another end of the insulating substrate with support member 235B with the vibration absorption member 108B interposed therebetween. As described above, one of the support units can be the fixing member 107.

The vibration of the vibrators 105A and 105B generates a standing wave 251 on the tactile presentation panel 100. FIG. 8 illustrates the largest amplitude of the standing wave 251. The frequency of the standing wave 251 depends on the frequencies of the vibrators 105A and 105B. In this example, the frequencies of the vibrators 105A and 105B are the same. They can be different. A standing wave having a node at an intended location can be generated by changing the frequency of the vibrators 105A and 105B and/or the phase difference therebetween. In the following description, both of the vibration frequency and the phase difference of the vibrators 105A and 105B are controlled. Another example can fix the frequency of the vibrators 105A and 105B and change only the phase difference.

When a plurality of fingers are touching the touchable region 104, tactile stimulus such as click feeling can be presented selectively to a specific finger by selecting a frequency and a phase difference for the standing wave. Specifically, the standing wave is generated so that an antinode is located near the finger to provide the click feeling and a node is located near the finger not to provide the click feeling.

The tactile presentation panel 100 can further include a force sensor. The force sensor detects the force applied to the user in the direction perpendicular to the main face of the tactile presentation panel 100. The controller 201 can make the vibrators 105A and 105B vibrate when a specific region on the touch electrode pattern 101 is touched and the value detected by the force sensor is higher than a threshold value. As to the function units of the controller 201, a plurality of function units can be integrated into one function unit or one function unit can be separated into a plurality of function units by function.

Generation of Driving Waveform

Figure 9:
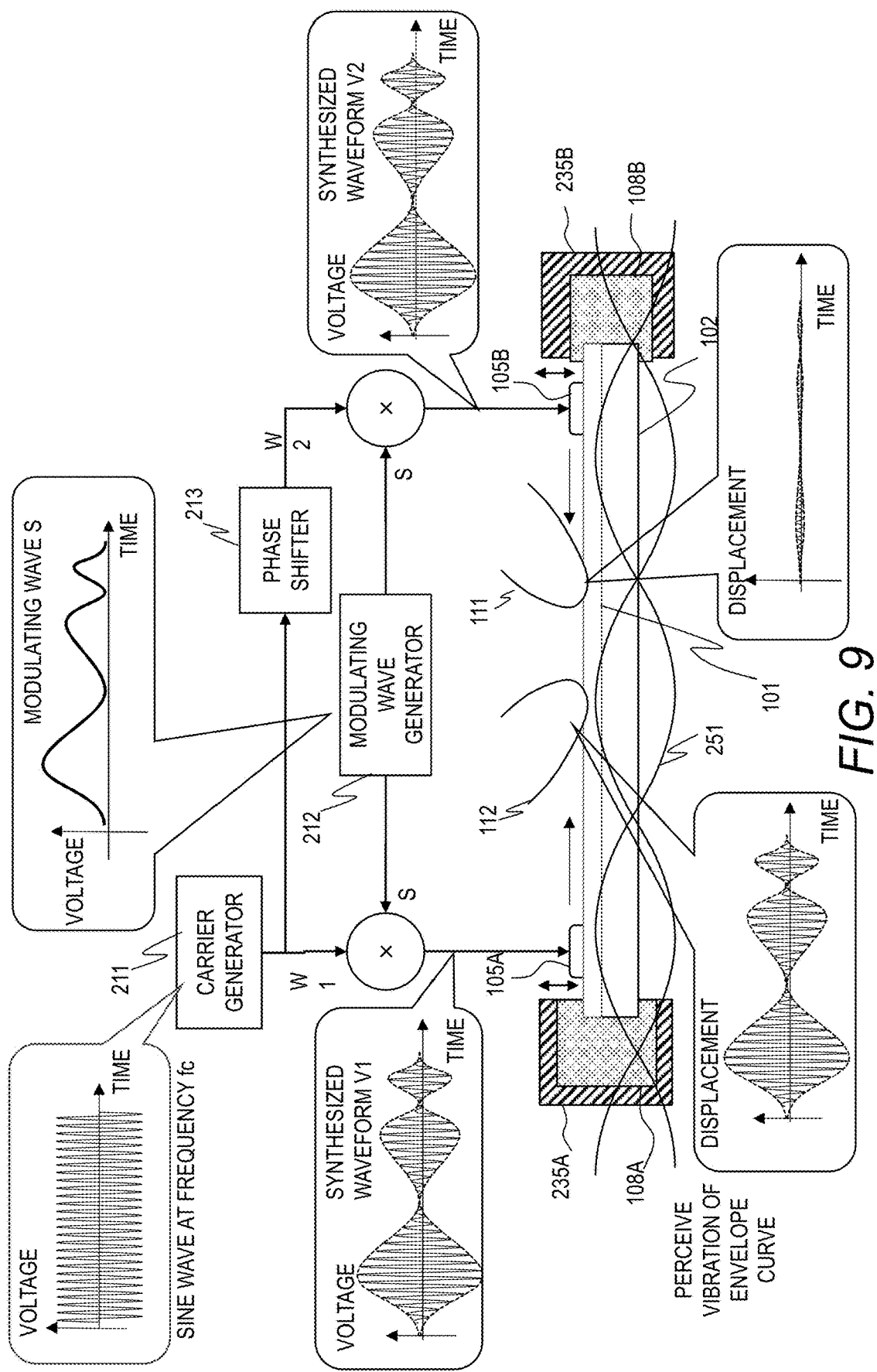
FIG. 9 is a schematic diagram for illustrating generation of driving signals by a waveform synthesizer and the standing wave generated by vibration of vibrators.

FIG. 9 is a schematic diagram for illustrating generation of driving signals V1 and V2 by the waveform synthesizer 203 (see FIG. 8) and the standing wave generated by vibration of the vibrators 105A and 105B. The controller 201 (see FIG. 8) determines the frequency and the phase difference of the vibration of the vibrators 105A and 105B so that a node of the standing wave will be located near the finger not to feel tactile stimulus in the two nearby fingers detected on the tactile presentation panel 100. As a result, only one of the two nearby fingers can feel the tactile stimulus.

The controller 201 locates touch points of two fingers that are simultaneously in contact with the insulating substrate 102 based on the signals from the touch electrode pattern 101. The controller 201 determines the finger not to be provided with tactile stimulus between the two fingers in accordance with the configuration. For example, the finger touching the background region is selected.

The controller 201 calculates the frequency fc and the phase difference ϕ so that an antinode and a node of the standing wave will be properly located at the fingers and makes the carrier generator 211 and the phase shifter 213 generate carriers W1 and W2. The controller 201 has information that associates combinations of a frequency fc and a phase difference ϕ of the driving signals (carriers) to be supplied to the vibrators 105A and 105B with locations of the nodes and the antinodes of the generated standing wave on the tactile presentation panel 100.

For example, the information can be a model that outputs a frequency fc and a phase difference ϕ in response to input of the location of a node or an antinode of the standing wave to be provided or information for providing a pattern (relation between the amplitude and the location) of the standing wave for each combination of a frequency fc and a phase difference ϕ. The controller 201 searches the information for the pattern that satisfies the specified locations of the node and antinode to determine the frequency fc and the phase difference ϕ.

For example, the controller 201 selects a standing wave such that one of the detected fingers is located within a predetermined distance from a node and the other finger is located away from any node by more than a predetermined distance. The controller 201 controls the waveform synthesizer 203 to generate driving signals V1 and V2 corresponding to the standing wave. In this way, the controller 201 can provide vibration to only one of two nearby fingers. In other words, the controller 201 can produce vibration at a desirable location and simultaneously eliminate the vibration at another desirable location.

As described above, the carrier generator 211 generates a carrier wave W1 of a sine wave at a frequency fc in accordance with an instruction from the controller 201. The frequency fc can be a frequency within a range from one to tens of kilohertz (kHz) for a human being not to be able to perceive vibration.

The modulating wave generator 212 generates a modulating wave S having a waveform of vibration intended to make the user feel. The modulating wave generator 212 generates and outputs a predetermined modulating wave S. The modulating wave S has a window function waveform that gradually increases and gradually decreases. The window function waveform can be a waveform composed of frequency components between 1 Hz and 500 Hz to characterize the tactile stimulus. Consequently, selective tactile presentation to a finger is available more appropriately.

The carrier W1 at a frequency fc is modulated by the modulating wave S having a waveform to make feel tactile stimulus into a driving signal having a synthesized waveform V1. The driving signal V1 is supplied to the vibrator 105A and the vibrator 105A vibrates in accordance with the driving signal V1. The carrier W1 at the frequency fc is provided with a phase difference ϕ by the phase shifter 213 to become a carrier W2. The carrier W2 is modulated by the modulating wave S into a driving signal having a synthesized waveform V2. The driving signal V2 is supplied to the vibrator 105B and the vibrator 105B vibrates in accordance with the driving signal V2.

The vibration propagates from the vibrators 105A and 105B to the insulating substrate 102 to become a standing wave 251. The finger 112 is located away from a node of the standing wave 251. In the example of FIG. 9, the finger 112 is located near an antinode of the standing wave 251. Large vibration is generated at the location of the finger 112 and the vibration of the envelope is perceived by the user. On the other hand, the finger 111 is touching a region near a node of the standing wave 251. Propagating waves cancel each other at a node and therefore, the vibration is very small there. Accordingly, the finger 111 does not feel vibration on the surface of the insulating substrate 102.

Vibration of Panel

Hereinafter, vibration of the standing wave in the touchable region 104 of the tactile presentation panel 100 is described. This section describes how the locations of the nodes and antinodes of the standing wave change with the phase difference or the frequency of a plurality of vibrators. The locations of the nodes and antinodes of the standing wave change continuously within a plane, where to present and where not to present tactile stimulus can be controlled more precisely.

Figure 10:
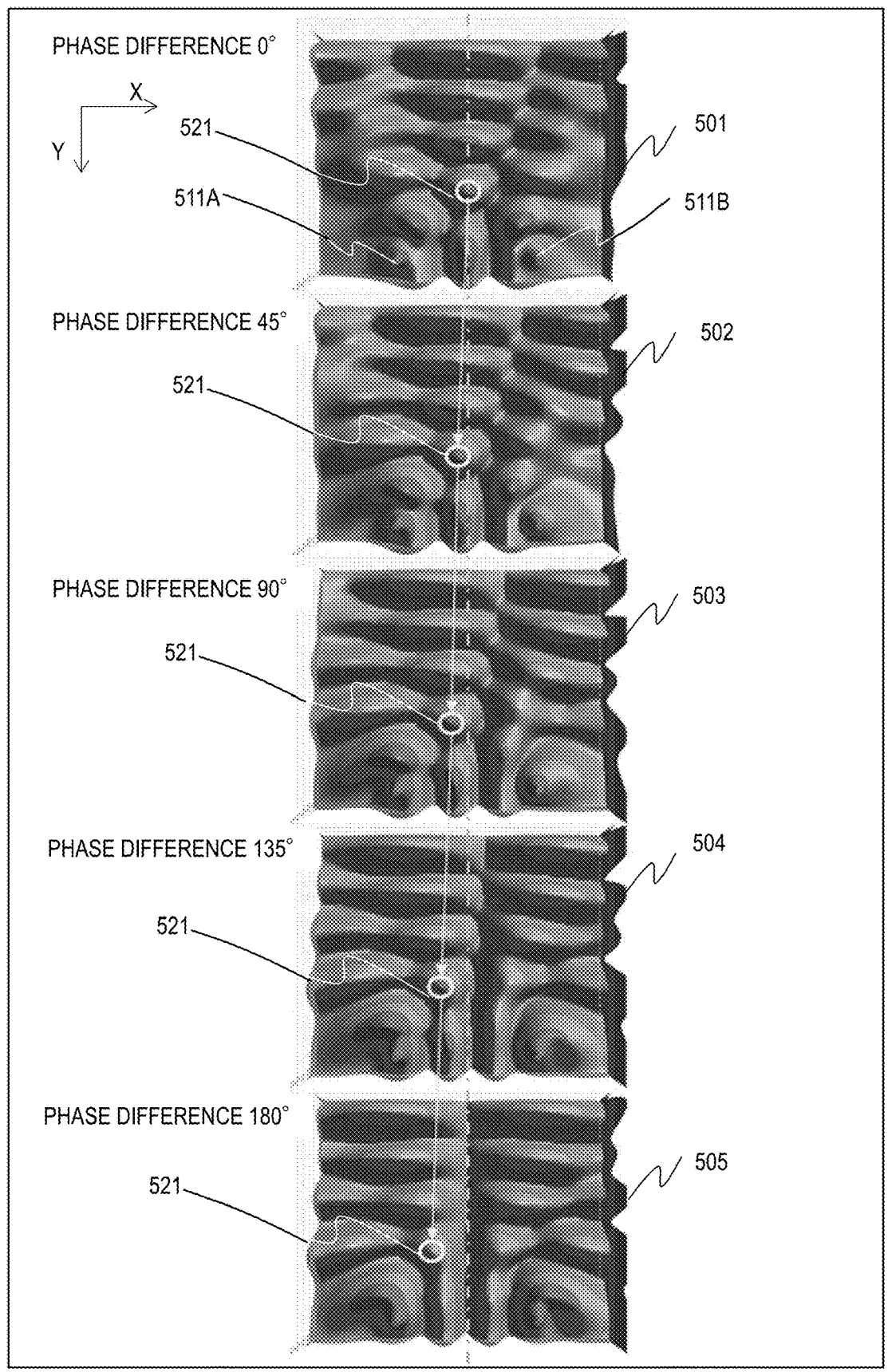
FIG. 10 provides a simulation result on the standing wave pattern varying with the phase difference between the two vibrators in the configuration example described with reference to FIGS. 2A and 2B.

FIG. 10 illustrates a simulation result on the standing wave pattern varying with the phase difference between the two vibrators 105 in the configuration example described with reference to FIGS. 2A and 2B. The configuration example described with reference to FIGS. 2A and 2B is such that three sides of a rectangular tactile presentation panel 100 form an absorber end region and one side is a fixed-end region. In the configuration where the fixed-end region is replaced by a free-end region, the standing wave pattern exhibits substantially the same variation.

In FIG. 10, the standing wave patterns 501 to 505 are the variations in standing wave pattern when the frequencies of the two vibrators are 1760 Hz and the phase difference is changed stepwise from 0° to 180°. The standing wave patterns 501 to 505 are standing wave patterns when the phase difference is 0°, 45°, 90°, 135°, and 180°.

As noted from the standing wave patterns 501 to 505, the standing wave has a mesh-like pattern. In the standing wave pattern 501, the locations 511A and 511B represent the locations where the vibrators are disposed. The circle 521 represents the location of one antinode. The reference signs 511A and 511B are omitted in the standing wave patterns 502 to 505.

As understood from FIG. 10, the circle 521 moves toward the left of FIG. 10 as the phase difference increases. In similar, the nodes move leftward as the phase difference increases. The locations of the nodes and antinodes can be changed continuously by changing the phase difference between the vibrators 105.

Figure 11:
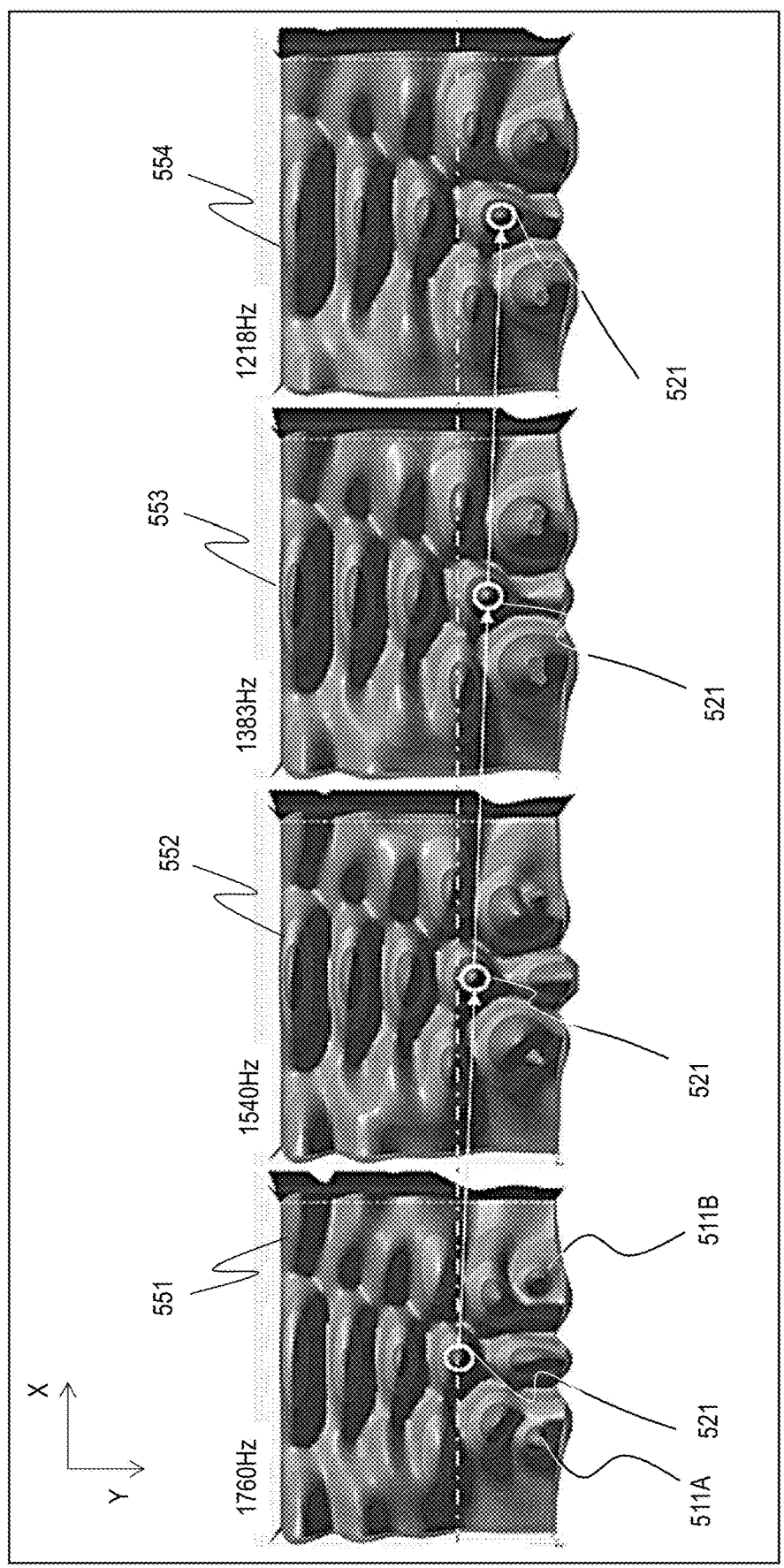
FIG. 11 provides a simulation result on the standing wave pattern varying with the frequency of the two vibrators in the configuration example described with reference to FIGS. 2A and 2B.

FIG. 11 provides a simulation result on the standing wave pattern varying with the frequency of the two vibrators 105 in the configuration example described with reference to FIGS. 2A and 2B. In the configuration where the fixed-end region is replaced by a free-end region, the standing wave pattern exhibits substantially the same variation.

In FIG. 11, the standing wave patterns 551 to 554 are the variations in standing wave pattern when the phase difference between the two vibrators 105 is 0° and the frequency is changed stepwise from 1760 Hz to 1218 Hz. The standing wave patterns 551 to 554 are standing wave patterns when the frequency is 1760 Hz, 1540 Hz, 1383 Hz, and 1218 Hz.

As noted from the standing wave patterns 551 to 554, the standing wave has a mesh-like pattern. In the standing wave pattern 551, the locations 511A and 511B represent the locations where the vibrators are disposed. The circle 521 represents the location of one antinode. The reference signs 511A and 511B are omitted in the standing wave patterns 552 to 554.

As understood from FIG. 11, the circle 521 moves toward the bottom of FIG. 11 as the frequency is lowered. In similar, the nodes move downward as the frequency is lowered. The intervals between nodes expand as the frequency is lowered and narrow as the frequency is raised with reference to the upper end of the standing wave pattern. Hence, the locations of nodes and antinodes can be changed continuously by changing the frequency of the vibrators 105.

As described with reference to FIG. 10, the location of a node can be changed continuously in the horizontal direction (the X-axis direction) by controlling the phase difference between the two vibrators 105. As described with reference to FIG. 11, the location of a node can be changed continuously in the vertical direction (the Y-axis direction) by controlling the frequency of the two vibrators 105. Accordingly, more precisely controlling the location of a node of the standing wave continuously within the plane is available by controlling the phase difference and the frequency of the vibrators 105.

Figure 12:
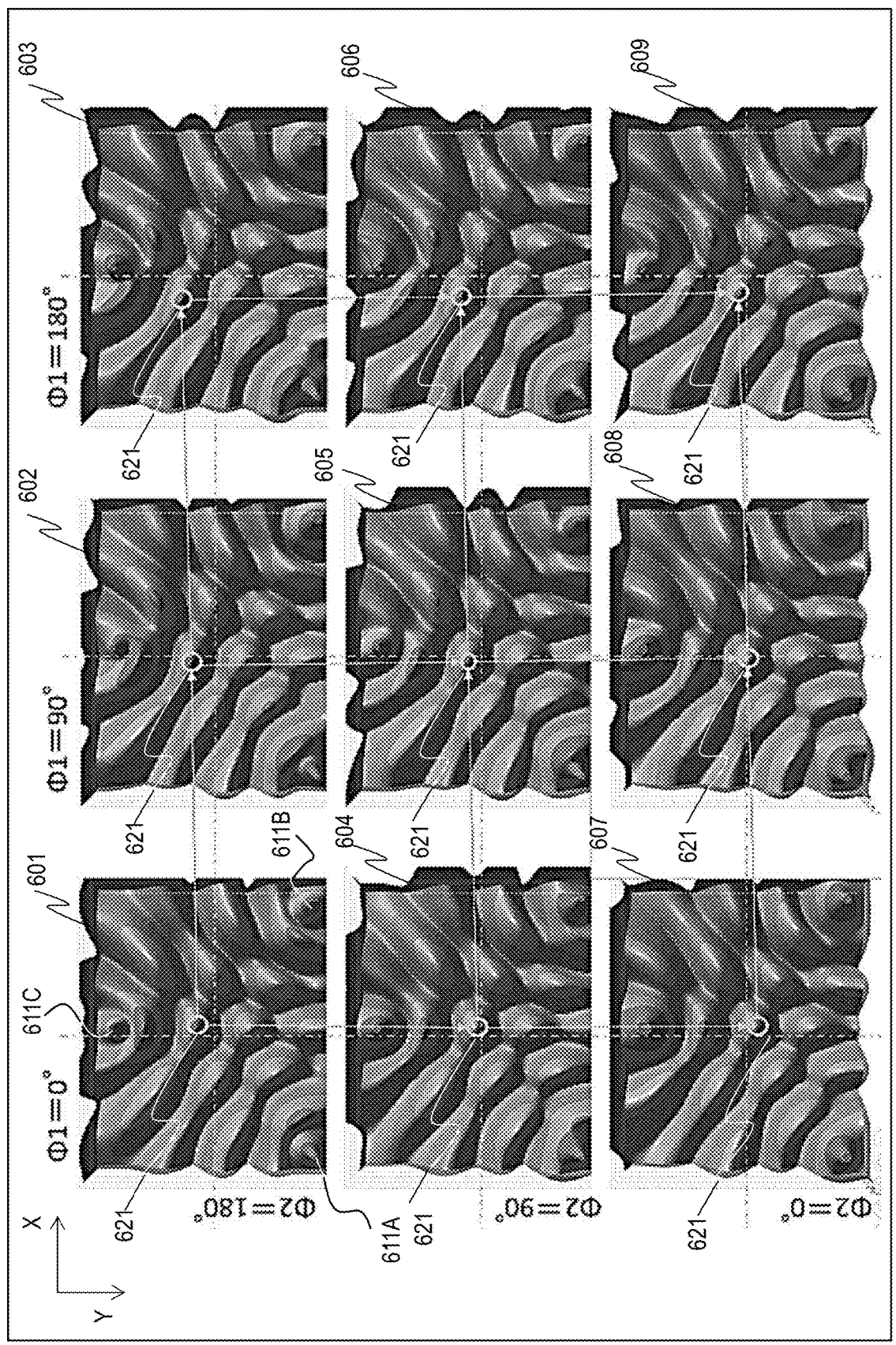
FIG. 12 provides a simulation result on the variation in standing wave pattern in a configuration example where three vibrators are disposed on the tactile presentation panel and the entire outer end of the tactile presentation panel is an absorber end region.

FIG. 12 provides a simulation result on the variation in standing wave pattern in a configuration example where three vibrators 105 are disposed on the tactile presentation panel 100 and the entire outer end of the tactile presentation panel 100 is an absorber end region (e.g., see FIG. 3). The frequencies of the three vibrators 105 are all fixed at 1760 Hz. FIG. 12 includes standing wave patterns 601 to 609; these are the variations in standing wave pattern caused by changes in phase differences among the three vibrators 105. As noted from the standing wave patterns 601 to 609, the standing wave has a mesh-like pattern.

The standing wave pattern 601 includes notations of the locations of the three vibrators 611A, 611B, and 611C. In the other standing wave patterns 602 to 609, the reference signs of the locations of the vibrators 611A, 611B, and 611C are omitted. The circle 621 in each of the standing wave patterns 601 to 609 represents the location of one antinode.

The locations of the vibrators 611A, 611B, and 611C are at the apexes of a virtual triangle. In the example of FIG. 12, the locations 611A, 611B, and 611C are at the apexes of a regular triangle. The locations 611A and 611B are near corners of the tactile presentation panel 100 and the location 611C is near the midpoint of one side of the tactile presentation panel 100. The locations 611A and 611B are at the same coordinate and the location 611C is at a different coordinate along the Y-axis (vertical axis). The location 611C is located at the center between the locations 611A and 611B along the X-axis (horizontal axis). The disposition of the three vibrators is satisfactory if they are located at the apexes of a triangle and is not limited to the example of FIG. 12.

The phase difference between the vibrators at the locations 611A and 611B is defined as $\phi 1$ and the phase difference between the vibrators at the locations 611A and 611C as $\phi 2$. As mentioned above, the frequencies fc of the carriers of the three vibrators are all 1760 Hz.

In the standing wave pattern 601, the phase difference $\phi 1$ is 0° and the phase difference $\phi 2$ is 180°. In the standing wave pattern 602, the phase difference $\phi 1$ is 90° and the phase difference $\phi 2$ is 180°. In the standing wave pattern 603, the phase difference $\phi 1$ is 180° and the phase difference $\phi 2$ is 180°. In the standing wave pattern 604, the phase difference $\phi 1$ is 0° and the phase difference $\phi 2$ is 90°. In the standing wave pattern 605, the phase difference $\phi 1$ is 90° and the phase difference $\phi 2$ is 90°. In the standing wave pattern 606, the phase difference $\phi 1$ is 180° and the phase difference $\phi 2$ is 90°. In the standing wave pattern 607, the phase difference $\phi 1$ is 0° and the phase difference $\phi 2$ is 0°. In the standing wave pattern 608, the phase difference $\phi 1$ is 90° and the phase difference $\phi 2$ is 0°. In the standing wave pattern 609, the phase difference $\phi 1$ is 180° and the phase difference $\phi 2$ is 0°.

In the standing wave patterns 601, 602, and 603, the phase differences $\phi 2$ are the same 180° and the phase differences $\phi 1$ are different. In the standing wave patterns 604, 605, and 606, the phase differences $\phi 2$ are the same 90° and the phase differences $\phi 1$ are different. In the standing wave patterns 607, 608, and 609, the phase differences $\phi 2$ are the same 0° and the phase differences $\phi 1$ are different. As noted from these standing wave patterns, change in the phase difference $\phi 1$ largely moves the nodes and antinodes horizontally (in the X-axis direction).

In the standing wave patterns 601, 604, and 607, the phase differences $\phi 1$ are the same 0° and the phase differences $\phi 2$ are different. In the standing wave patterns 602, 605, and 608, the phase differences $\phi 1$ are the same 90° and the phase differences $\phi 2$ are different. In the standing wave patterns 603, 606, and 609, the phase differences $\phi 1$ are the same 180° and the phase differences $\phi 2$ are different. As noted from these standing wave patterns, change in the phase difference $\phi 2$ largely moves the nodes and antinodes vertically (in the Y-axis direction).

In summary, the locations of nodes and antinodes can be changed continuously in the horizontal direction (the X-axis direction) by changing the phase difference $\phi 1$ between the vibrators 105. Furthermore, the locations of nodes and antinodes can be changed continuously in the vertical direction (the X-axis direction) by changing the phase difference $\phi 2$. Accordingly, more precisely controlling the location of a node of the standing wave continuously within the plane is available by controlling the phase differences among the vibrators 105.

Figure 13:
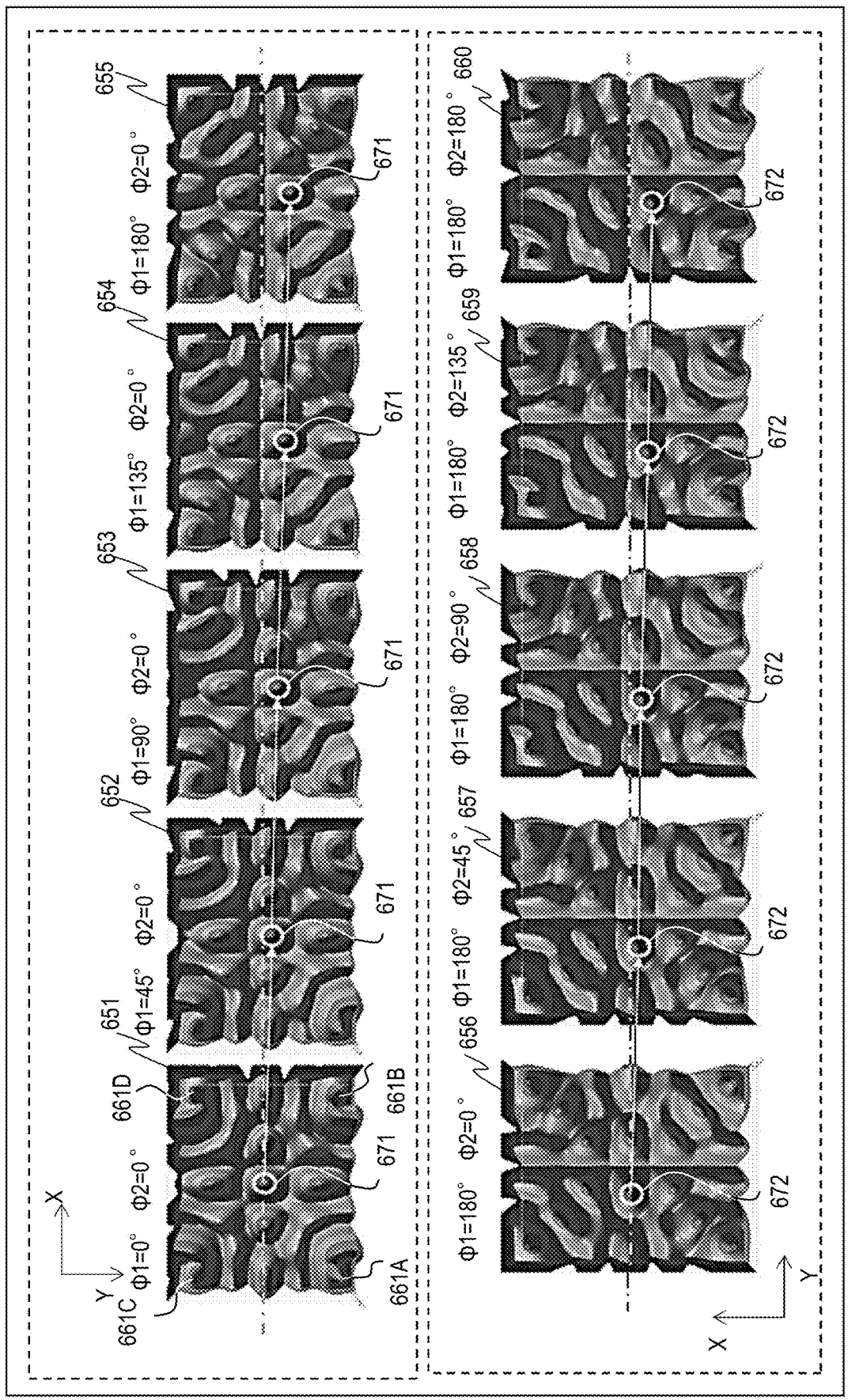
FIG. 13 provides a simulation result on the variation in standing wave pattern in a configuration example where four vibrators are disposed on the tactile presentation panel and the entire outer end of the tactile presentation panel is an absorber end region.

FIG. 13 provides a simulation result on the variation in standing wave pattern in a configuration example where four vibrators 105 are disposed on the tactile presentation panel 100 and the entire outer end of the tactile presentation panel 100 is an absorber end region (e.g., see FIG. 4). The frequencies of the four vibrators 105 are all fixed at 1760 Hz. FIG. 13 includes standing wave patterns 651 to 660; these are the variations in standing wave pattern caused by changes in phase difference among the four vibrators 105. As noted from the standing wave patterns 651 to 660, the standing wave has a mesh-like pattern.

The standing wave pattern 651 includes notations of the locations of the four vibrators 661A, 661B, 661C, and 661D. In the other standing wave patterns 652 to 660, the reference signs of the locations of the vibrators 661A, 661B, 661C, and 661D are omitted. The circle 671 in each of the standing wave patterns 651 to 655 represents the location of one antinode. The circle 672 in each of the standing wave patterns 656 to 660 represents the location of another antinode. For convenience of illustration, the orientations of the standing wave patterns 651 to 655 are different from the orientations of the standing wave patterns 656 to 660 by 90°.

The locations of the vibrators 661A to 661D are at the apexes of a virtual quadrangle. In the example of FIG. 13, the locations 661A to 661D are at the apexes of a rectangle. The locations 661A to 661D are near the corners of the tactile presentation panel 100. The disposition of the four vibrators is satisfactory if they are located at the apexes of a quadrangle and is not limited to the example of FIG. 13.

The phase difference between the vibrators at the locations 661A and 661B is defined as $\phi 1$ and the phase difference between the vibrators at the locations 661A and 661C as $\phi 2$. The phase difference between the vibrators at the locations 661A and 661D is $\phi 1+\phi 2$. As mentioned above, the frequencies fc of the carriers of the four vibrators are all 1760 Hz.

In the standing wave patterns 651 to 655, the phase differences $\phi 2$ are the same 0° and the phase differences $\phi 1$ are different. Specifically, the phase differences $\phi 1$ in the standing wave patterns 651 to 655 are 0°, 45°, 90°, 135°, and 180°. The phase differences $\phi 1$ in the standing wave patterns 656 to 660 are the same 180° and the phase differences $\phi 2$ are different. Specifically, the phase differences $\phi 2$ in the standing wave patterns 656 to 660 are 0°, 45°, 90°, 135°, and 180°.

As understood from the standing wave patterns 651 to 655, the locations of nodes change continuously in the vertical direction (in the Y-axis direction) as the phase difference $\phi 1$ changes. As understood from the standing wave patterns 656 to 660, the locations of nodes change continuously in the horizontal direction (in the X-axis direction) as the phase difference $\phi 2$ changes. Accordingly, more precisely controlling the location of a node of the standing wave continuously within the plane is available by controlling the phase differences among the vibrators 105.

Figure 14:
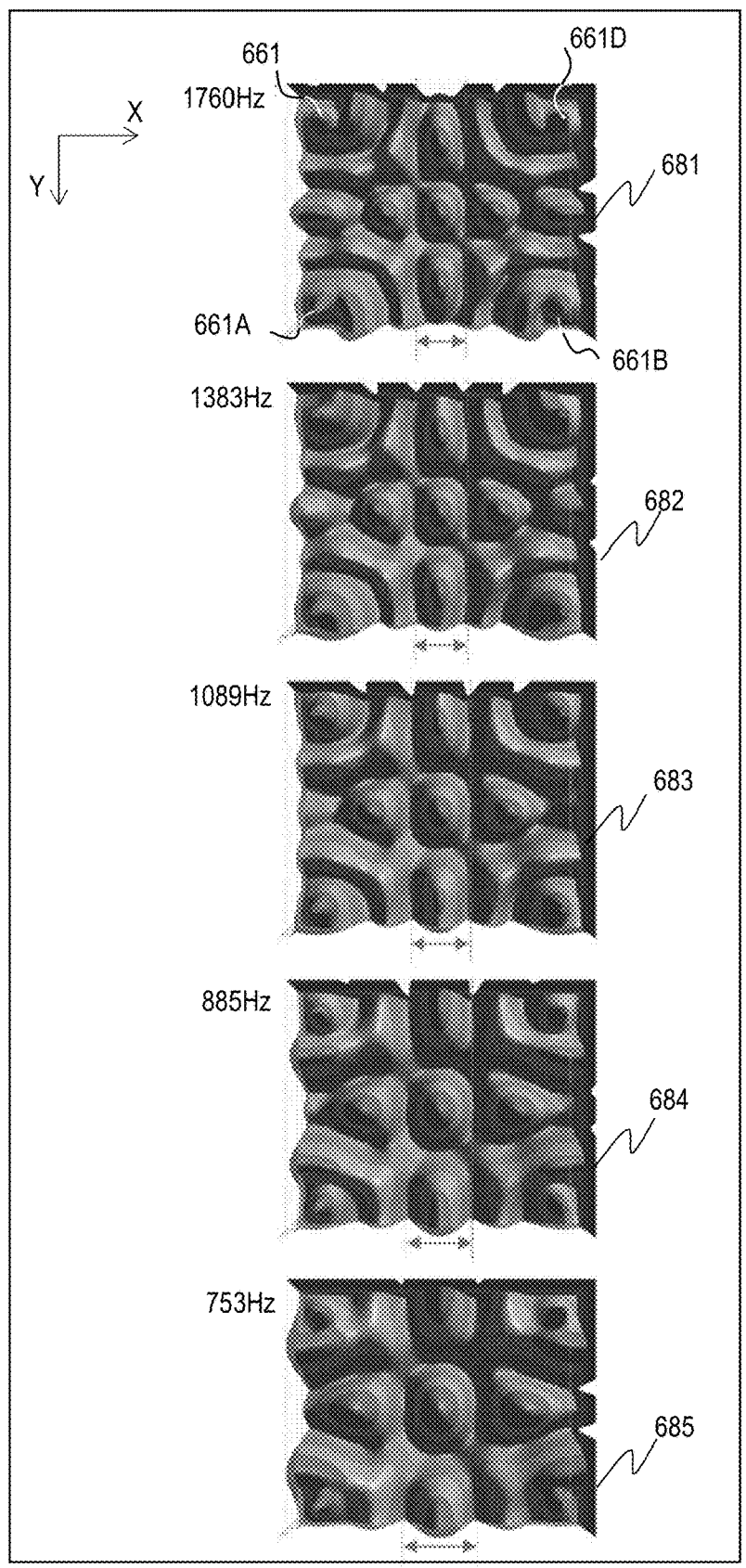
FIG. 14 provides a simulation result on the variation in standing wave pattern in a configuration example where four vibrators are disposed on the tactile presentation panel and the entire outer end of the tactile presentation panel is an absorber end region with variation in frequency of the four vibrators.

FIG. 14 provides a simulation result on the variation in standing wave pattern in a configuration example where four vibrators 105 are disposed on the tactile presentation panel 100 and the entire outer end of the tactile presentation panel 100 is an absorber end region (e.g., see FIG. 4) with variation in frequency of the four vibrators.

In FIG. 14, the standing wave patterns 681 to 685 are the variations in standing wave pattern when the phase difference among the four vibrators 105 is 0° and the frequency is changed stepwise from 1760 Hz to 753 Hz. The standing wave patterns 681 to 685 are the standing wave patterns when the frequency is 1760 Hz, 1383 Hz, 1089 Hz, 885 Hz, and 753 Hz.

As noted from the standing wave patterns 681 to 685, the standing wave has a mesh-like pattern. As understood from FIG. 14, the interval between nodes expands in the horizontal direction (the X-axis direction) and the vertical direction (the Y-axis direction) as the frequency is lowered and narrows as the frequency is raised. Hence, the locations of nodes and antinodes can be changed continuously within the plane by changing the frequency of the vibrators 105. The locations to present and not to present tactile stimulus can be controlled more precisely by controlling both the phase differences and the frequency of the four vibrators.

Figure 15:
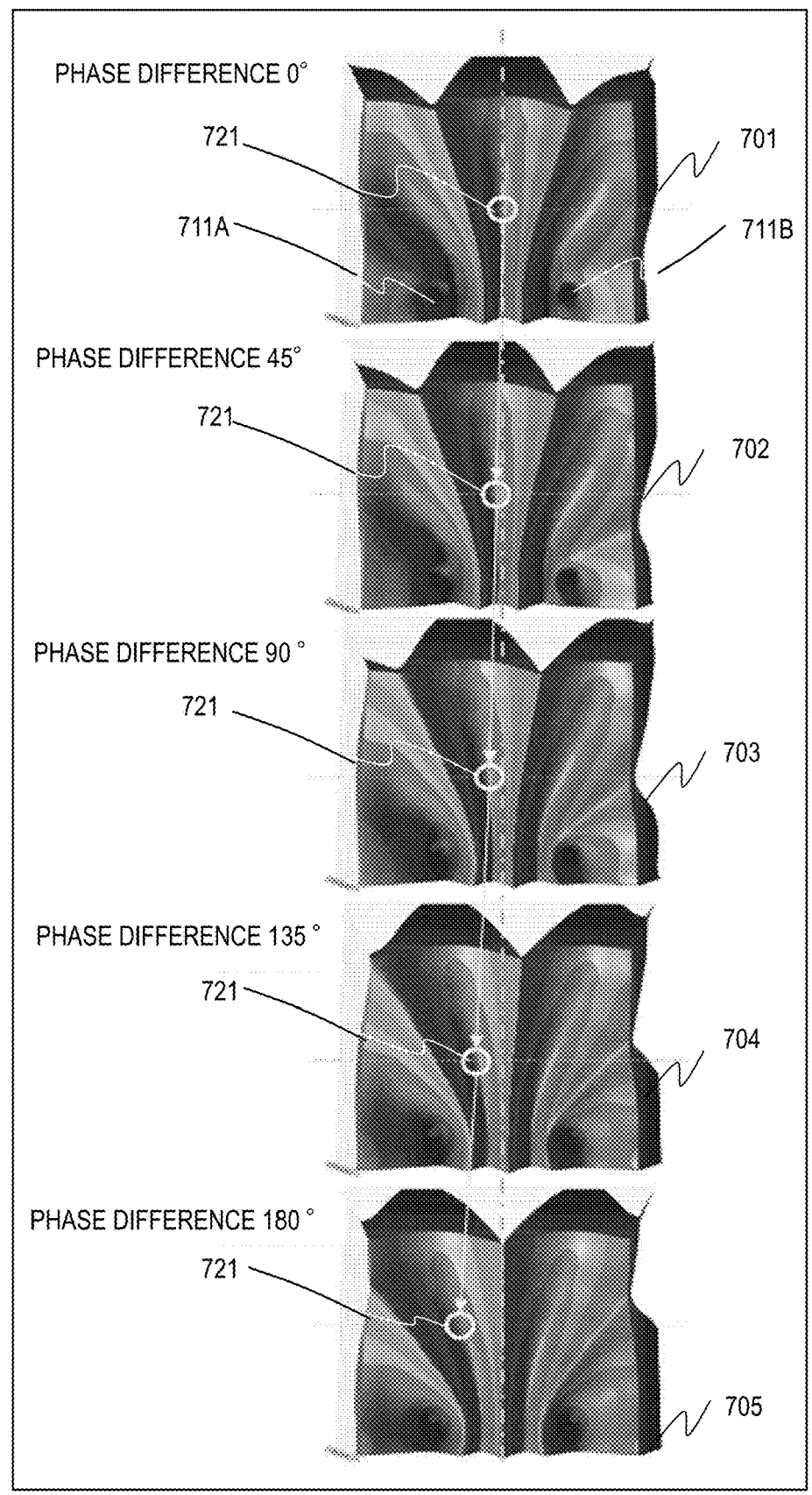
FIG. 15 provides a simulation result on the standing wave pattern varying with the phase difference between the two vibrators in the configuration example described with reference to FIGS. 1A and 1B.

FIG. 15 provides a simulation result on the standing wave pattern varying with the phase difference between the two vibrators 105 in the configuration example described with reference to FIGS. 1A and 1B. The configuration example described with reference to FIGS. 1A and 1B is such that the entire outer end of a rectangular tactile presentation panel 100 is an absorber end region.

In FIG. 15, the standing wave patterns 701 to 705 are the variations in standing wave pattern when the frequencies of the two vibrators are 1760 Hz and the phase difference is changed stepwise from 0° to 180°. The standing wave patterns 701 to 705 are standing wave patterns when the phase difference is 0°, 45°, 90°, 135°, and 180°.

In the standing wave pattern 701, the locations 711A and 711B represent the locations where the vibrators are disposed. The circle 721 represents the location of one antinode. The reference signs 711A and 711B are omitted in the standing wave patterns 702 to 705.

As understood from FIG. 15, the circle 721 moves toward the left of FIG. 15 as the phase difference increases. In similar, the nodes move leftward as the phase difference increases. The locations of the nodes and antinodes can be changed continuously by changing the phase difference between the vibrators 105.

Figure 16:
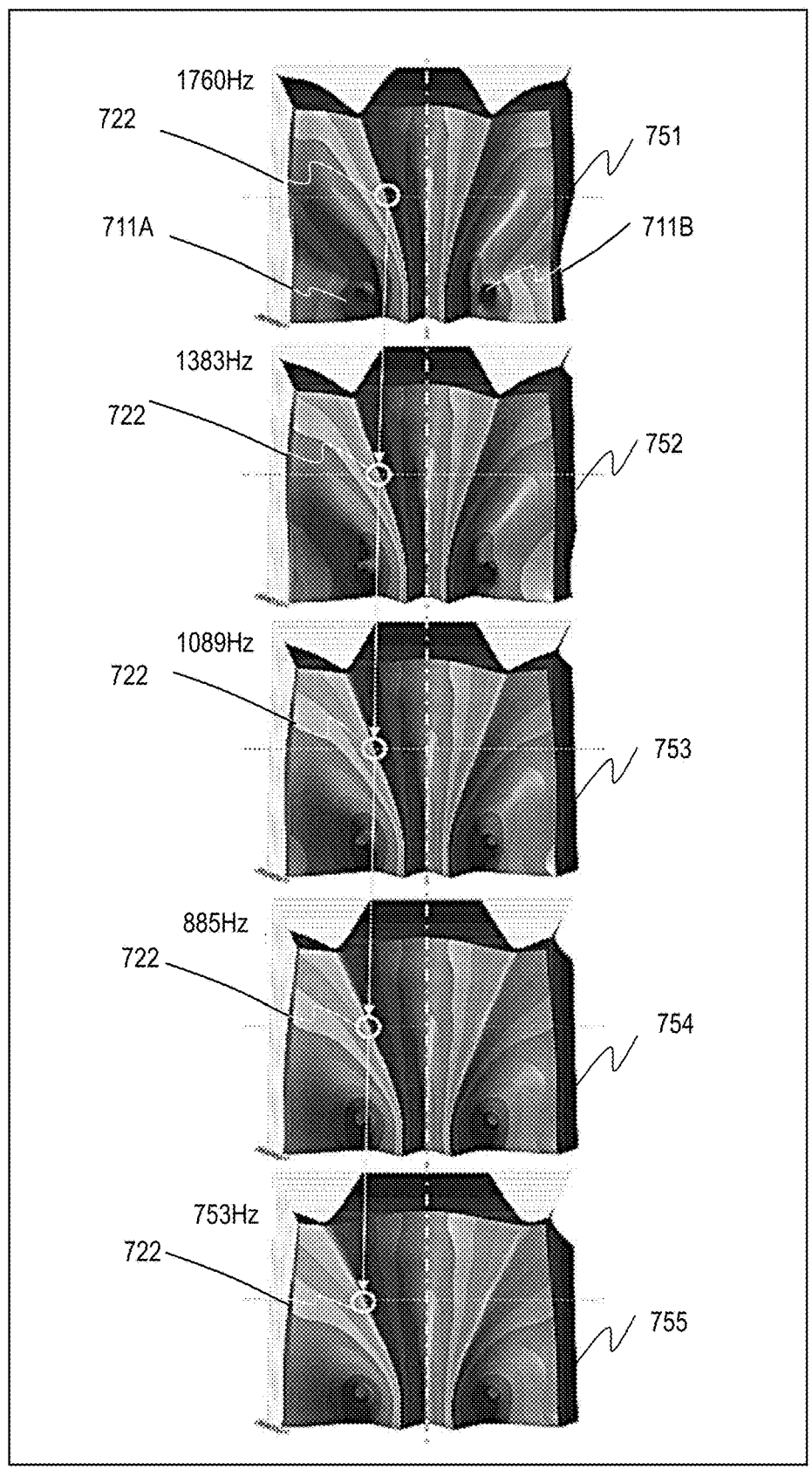
FIG. 16 provides a simulation result on the standing wave pattern varying with the frequency of the two vibrators in the configuration example described with reference to FIGS. 1A and 1B.

FIG. 16 provides a simulation result on the standing wave pattern varying with the frequency of the two vibrators 105 in the configuration example described with reference to FIGS. 1A and 1B. In FIG. 16, the standing wave patterns 751 to 755 are the variations in standing wave pattern when the phase difference between the two vibrators 105 is 0° and the frequency is changed stepwise from 1760 Hz to 753 Hz. The standing wave patterns 751 to 755 are the standing wave patterns when the frequency is 1760 Hz, 1383 Hz, 1089 Hz, 885 Hz and 753 Hz.

In the standing wave pattern 751, the locations 711A and 711B are the locations where the vibrators are disposed. The circle 722 represents the location of one node. The reference signs 711A and 711B are omitted in the standing wave patterns 752 to 755.

As understood from FIG. 16, the circle 722 moves toward the bottom of FIG. 16 as the frequency is lowered. The interval between nodes expands in the horizontal direction (the X-axis direction) as the frequency is lowered and narrows as the frequency is raised. Hence, the intervals between nodes and between antinodes can be changed continuously by changing the frequency of the vibrators 105. Consequently, the locations of the nodes and antinodes can be changed continuously. More precisely controlling the location of a node of the standing wave continuously within the plane is available by controlling the phase difference and the frequency of the vibrators 105.

In the following, the absorptance of the absorber end region is described. The absorber end can lower the absolute value of the reflectance of the propagating wave. The reflectance of the propagating wave off the most effective absorber end is 0 (the absorptance is 100). The reflectance of the propagating wave off the most effective fixed end is −1 and the reflectance off a free end is 1. A negative reflectance means that the phase of the reflected wave is inverted from the phase of the incident wave or that the direction of displacement of the reflected wave is opposite. The absorptance of an absorber end region in the embodiments of this specification can be lower than 100.

As described above, the locations of nodes and antinodes can be changed continuously within the touchable region 104 by changing the phase differences or the frequencies of the vibrators. A node and an antinode can be located at two points in the touchable region 104 by combining the frequencies and the phase differences of the vibrators. Unless the maximum amplitude at a node is higher than the minimum amplitude at an antinode in any combinations of two locations in the touchable region 104, localization of tactile stimulus at a desirable location within the touchable region 104 is available while controlling the maximum amplitude at the node to be lower than the tactile discrimination threshold.

FIG. 17 provides a simulation result obtained from the configuration example where four vibrators are provided and the entire outer end is an absorber end region as described with reference to FIGS. 4, 13, and 14. The simulation maintained the phase difference $\phi 2$ at 0° and changed the phase difference $\phi 1$ from 0° to 360° for each combination of a different frequency and a different absorptance. The lower the absorptance, the smaller the region (referred to as tactile presentable region) where the maximum amplitude at a node is smaller than the minimum amplitude at an antinode.

As indicated in FIG. 17, when the frequency is 1760 Hz and the absorptance is from 100% to 70%, the difference in amplitude between nodes and antinodes is large and therefore, the region to be actually provided with tactile stimulus can be localized anywhere. When the absorptance is lowered to below 60% at this frequency, the amplitudes at the nodes near a vibrator become large to get close to the minimum amplitude at antinodes. Even in this case, localization of tactile stimulus within the touchable region 104 is available by defining the middle of the tactile presentation panel 100 as the touchable region 104.

When the absorptance is further lowered to below 30%, the tactile presentable region further becomes smaller and not enough for practical use. At the absorptance of below 10%, the localization of tactile stimulus is available only in the central area of the tactile presentation panel 100. Localization of tactile stimulus is available at any point when the absorptance is from 100% to 60%, because the difference in amplitude between nodes and antinodes is large in the region inner than the vibrators.

When the frequency is 615 Hz and the absorptance is from 100% to 30%, the difference in amplitude between nodes and antinodes is large, the region to be actually provided with tactile stimulus can be localized anywhere. When the absorptance is lowered to below 10%, the tactile presentable region becomes small and not enough for practical use.

FIG. 18 provides a simulation result obtained from the configuration example where three vibrators are provided and the entire outer end is an absorber end region as described with reference to FIGS. 3 and 12. The simulation maintained the phase difference $\phi 1$ at 0° and changed the phase difference $\phi 2$ from 0° to 360° for each combination of a different frequency and a different absorptance. The lower the absorptance, the smaller the region (referred to as tactile presentable region) where the maximum amplitude at a node is smaller than the minimum amplitude at an antinode.

As indicated in FIG. 18, when the absorptance is from 100% to 30% at the frequency of 1760 Hz and 1057 Hz, the difference in amplitude between nodes and antinodes is large and therefore, the region to be actually provided with tactile stimulus can be localized anywhere. When the absorptance is lowered to below 10%, the tactile presentable region becomes small and not enough for practical use.

As set forth above, embodiments of this application have been described; however, this disclosure is not limited to the foregoing embodiments. Those skilled in the art can easily modify, add, or convert each element in the foregoing embodiments within the scope of this disclosure. A part of the configuration of one embodiment can be replaced with a configuration of another embodiment or a configuration of an embodiment can be incorporated into a configuration of another embodiment.

What is claimed is:
1. A tactile presentation device comprising:
a panel including a region touchable by a user;
a plurality of vibrators disposed outside the touchable region on the panel; and
a driving controller configured to supply driving signals to the plurality of vibrators,
wherein at least a part of a region of an entire outer end of the panel is an absorber end region, wherein each point closest to one of the plurality of vibrators on the entire outer end of the panel is included in the absorber end region, wherein the driving controller is configured to supply the driving signals to the plurality of vibrators to generate a standing wave on the touchable region, wherein each of the driving signals is a synthetic wave of a carrier and a modulating wave at a frequency lower than a frequency of the carrier, and wherein the driving controller is configured to change a location of a node of the standing wave in the touchable region with frequencies and phase differences among carriers of the driving signals for the plurality of vibrators.

2. The tactile presentation device according to claim 1, wherein an absorption rate of the absorber end region is 40% or more.

3. The tactile presentation device according to claim 1, wherein an absorption rate of the absorber end region is 70% or more.

4. The tactile presentation device according to claim 1, wherein the driving controller is configured to control vibration of the plurality of vibrators in such a manner that a minimum amplitude at an antinode of the standing wave is larger than a maximum amplitude at a node of the standing wave in the touchable region.

5. The tactile presentation device according to claim 1, wherein an angle of view when viewing the absorber end region from any point of the touchable region is 180° or more.

6. The tactile presentation device according to claim 1, wherein the part other than the absorber end region in the entire outer end of the panel is a fixed-end region.

7. The tactile presentation device according to claim 1,
wherein an entire region of the entire outer end of the panel is the absorber end region, and
wherein the plurality of vibrators are three or more vibrators.

* * * * *